United States Patent [19]
Ketseoglou et al.

[11] Patent Number: 5,732,076
[45] Date of Patent: Mar. 24, 1998

[54] COEXISTING COMMUNICATION SYSTEMS

[75] Inventors: Thomas J. Ketseoglou; Robert C. Dixon, both of Colorado Springs, Colo.; Wesley Masenten, Irvine, Calif.

[73] Assignee: Omnipoint Corporation, Colorado Springs, Colo.

[21] Appl. No.: 548,544

[22] Filed: Oct. 26, 1995

[51] Int. Cl.⁶ .................................................. H04J 3/16
[52] U.S. Cl. .......................... 370/347; 370/280; 370/281; 455/51.1
[58] Field of Search .................................... 370/24, 29, 30, 370/95.1, 95.3, 100.1, 18, 23, 321, 347, 350, 329, 330, 337, 280, 281, 276, 324, 277; 375/354, 355, 356, 200; 455/33.1, 51.1, 53.1, 54.1

[56] References Cited

U.S. PATENT DOCUMENTS

| | | | |
|---|---|---|---|
| 4,797,947 | 1/1989 | Labedz | 455/33 |
| 5,097,484 | 3/1992 | Akaiwa | 375/40 |
| 5,200,956 | 4/1993 | Pudney et al. | 370/95.1 |
| 5,278,835 | 1/1994 | Ito et al. | 370/95.3 |
| 5,282,202 | 1/1994 | Bernstein et al. | 370/94.1 |
| 5,299,198 | 3/1994 | Kay et al. | 370/95.3 |
| 5,313,457 | 5/1994 | Hostetter et al. | 370/18 |
| 5,349,635 | 9/1994 | Scott | 379/97 |
| 5,400,359 | 3/1995 | Hikoso et al. | 375/200 |
| 5,471,509 | 11/1995 | Wood et al. | 375/350 |
| 5,475,677 | 12/1995 | Arnold et al. | 370/29 |
| 5,481,533 | 1/1996 | Honig et al. | 370/18 |
| 5,504,738 | 4/1996 | Sambamurthy et al. | 370/31 |
| 5,506,837 | 4/1996 | Söllner et al. | 370/31 |
| 5,530,700 | 6/1996 | Tran et al. | 370/79 |
| 5,561,666 | 10/1996 | Christensen et al. | 370/24 |

*Primary Examiner*—Douglas W. Olms
*Assistant Examiner*—Ajit Patel
*Attorney, Agent, or Firm*—Lyon & Lyon LLP

[57] ABSTRACT

An integrated communication system supporting multiple TDMA or TDD communication protocols whereby both protocols are supported within the same geographic region. Each protocol defines time frames and/or time slots of a different duration, from which is derived a composite time frame having a predefined timing structure. A first base station unit communicates in a first set of time slots of the composite time frame according to a first TDMA or TDD protocol, and a second base station unit (which may be collocated with the first base station unit) communicates in a second set of time slots of the composite time frame according to a second TDMA or TDD protocol. Coordinating electronics (such as a GPS receiver in one or both base station units) are provided so as to prevent collisions between communications occurring between each base station unit and its respective users. In a particular embodiment, a first protocol is a GSM protocol, and a second protocol is a TDD protocol utilizing spread spectrum techniques. The TDD protocol is structured so that each time slot is twice the duration of a GSM time slot, and each time frame is four times the duration of a GSM time frame. The system may comprise a number of "stacked" base stations in a single cell, each operating over a different frequency or using different spreading codes.

29 Claims, 20 Drawing Sheets

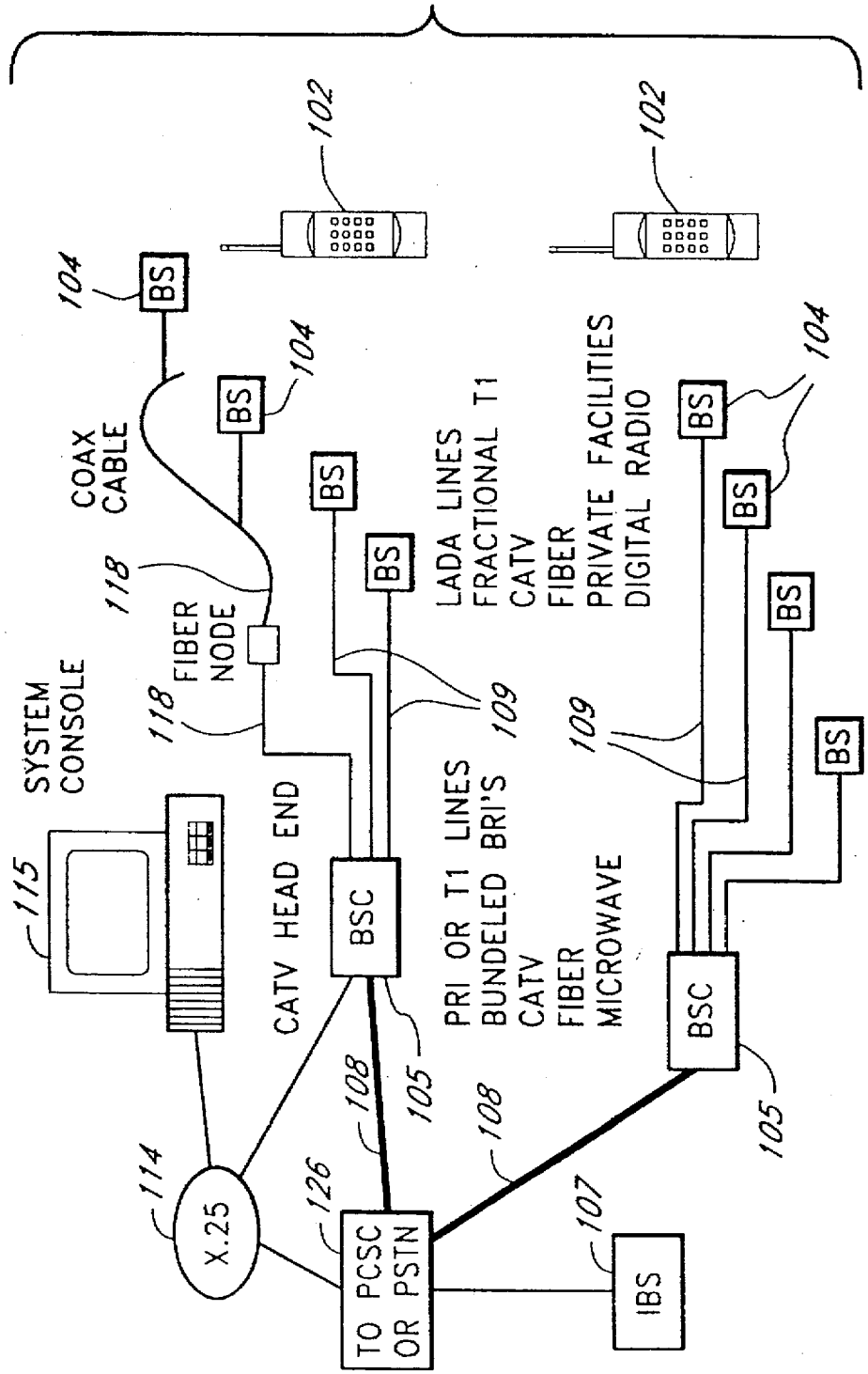

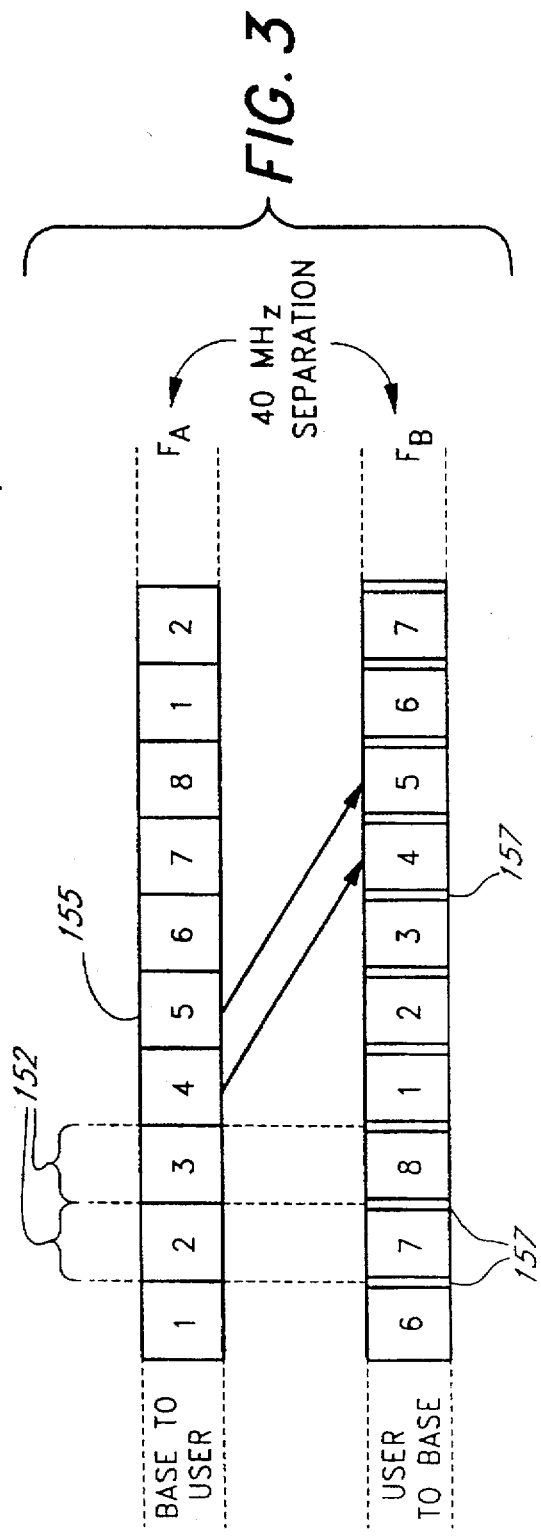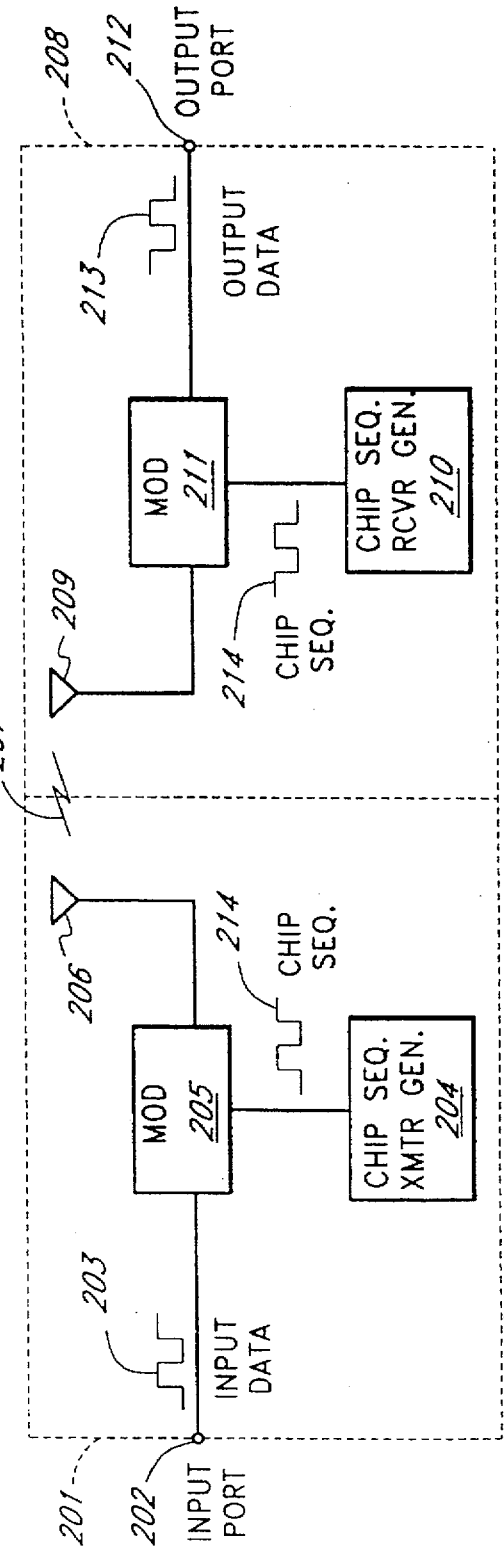

(VIRTUAL TIME SLOTS)

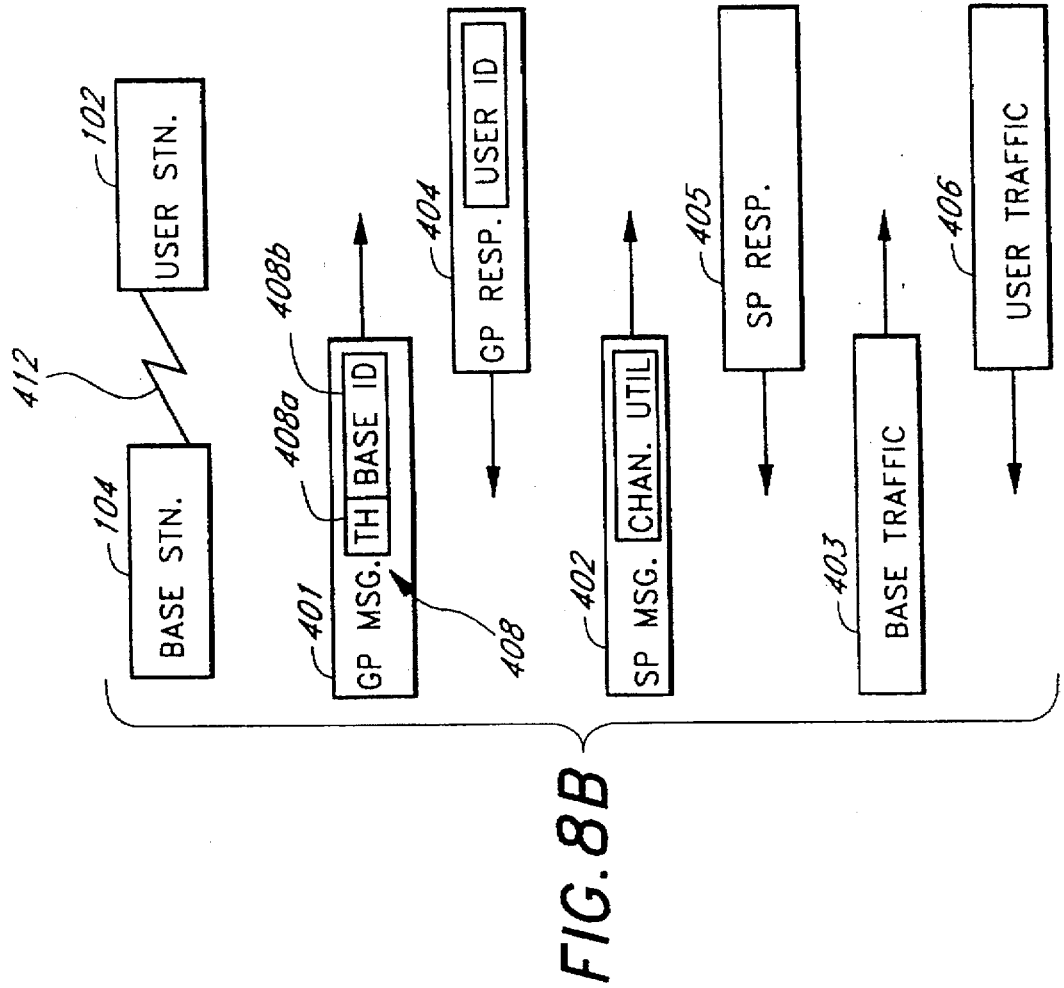
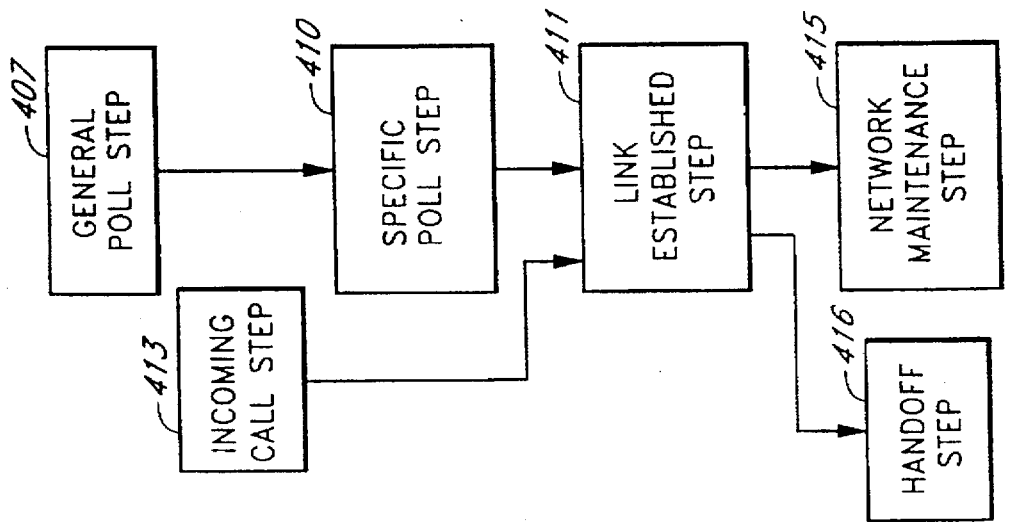

FIG.10A

BS GENERAL POLL MESSAGE FORMAT

| HEADER | SPARE | ZONE | BSC ID | BASE ID | FACILITY | SYSTEM TYPE | SERVICE PROVIDER | SLOT QUALITY | FEC | FCW |
|---|---|---|---|---|---|---|---|---|---|---|
| 702 | 703 | 704 | 705 | 706 | 707 | 708 | 709 | 710 | 711 | 712 |

FIG.10B

BS SPECIFIC POLL MESSAGE FORMAT

| HEADER | CORRECTIVE ID | CAUSE | PID | OTA MAP TYPE | OTA MAP | SPARE | SLOT QUALITY | FEC | FCW |
|---|---|---|---|---|---|---|---|---|---|
| 721 | 722 | 723 | 724 | 725 | 726 | 727 | 728 | 729 | 730 |

FIG.10C

MS POLL RESPONSE MESSAGE FORMAT

| HEADER | SPARE | PID | SERVICE PROVIDER | CLASS | MS CAPABILITIES | SPARK | FEC | FCW |
|---|---|---|---|---|---|---|---|---|
| 741 | 742 | 743 | 744 | 745 | 746 | 747 | 748 | 749 |

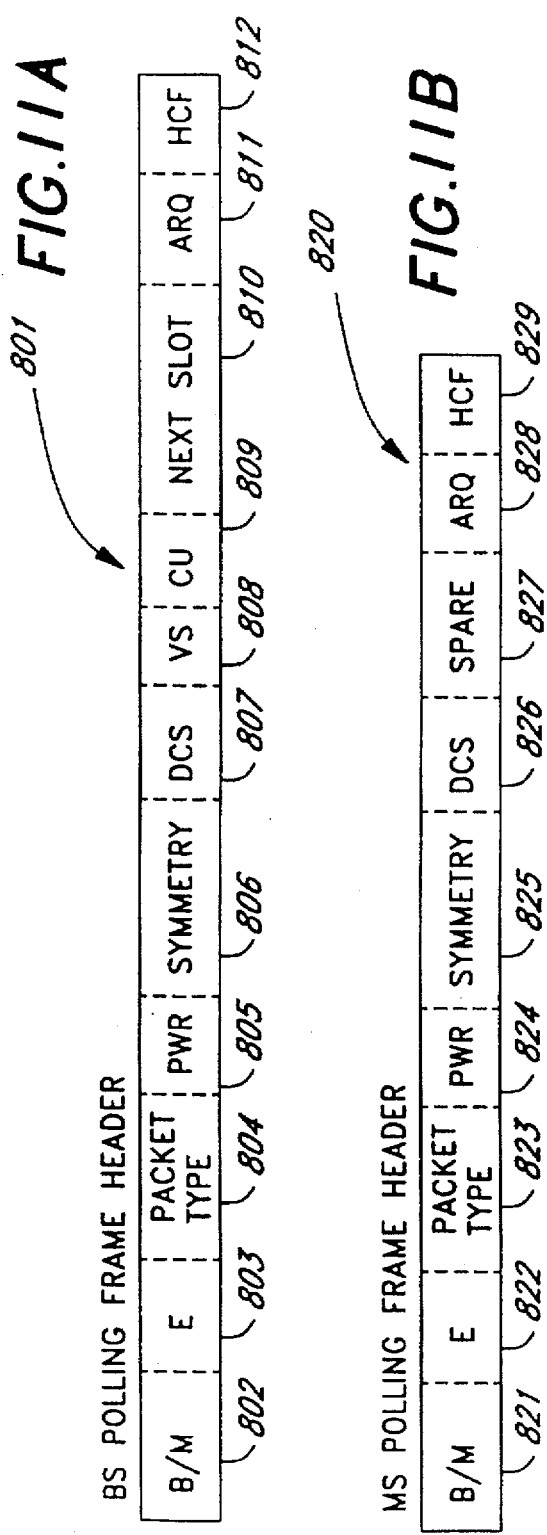
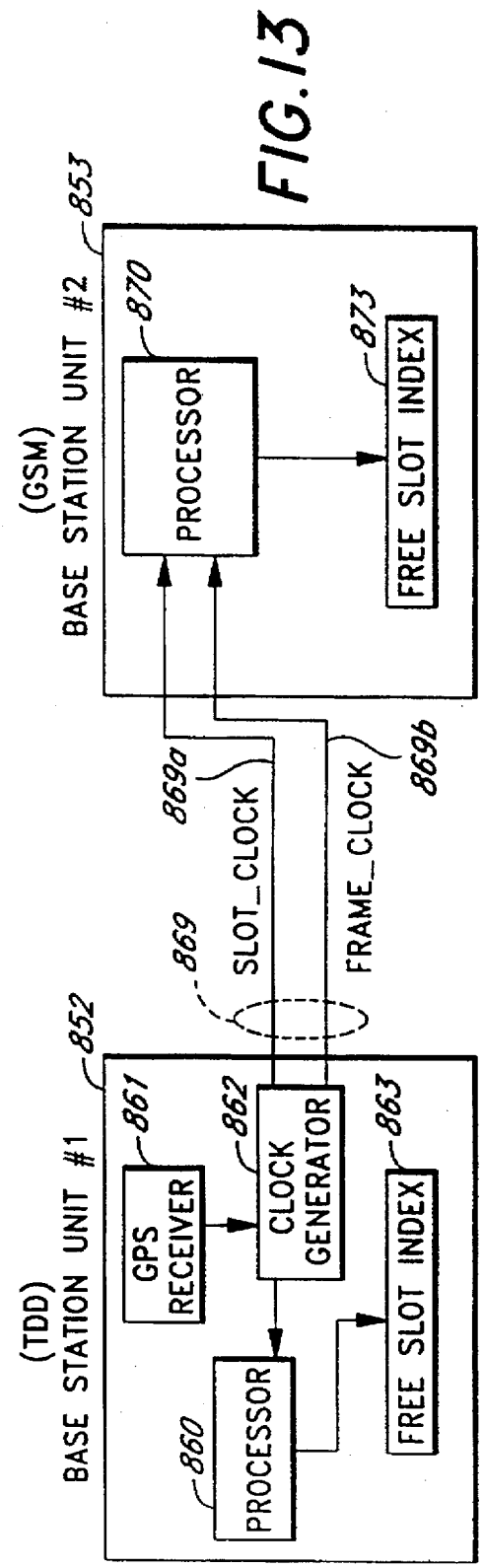

BS PACKET

| | 8 | 7 | 6 5 | 4 | 3 2 | 1 | OCTETS |
|---|---|---|---|---|---|---|---|
| BS HEADER (23 BITS) | B/H | E | PACKET TYPE | PWR | SYMMERTY | DCS | 1 |
| | VS | | CU | | NEXT SLOT | | 2 |
| | ARQ | | | HCF | | //// | 3 |
| D-CHANNEL | D-CHANNEL OR CORRELATIVE ID (1BYTE) | | | | | | 4 |
| B-CHANNEL | BEARER DATA OR SIGNALING DATA (24 BYTES FOR DATA & HIGHER LEVEL FEC) | | | | | | 5 ... 28 |
| FWC | FCW(FRAME CHECK WORD) | | | | | | 29 30 |

FIG.12A

MS PACKET

| | 8 | 7 | 6 5 | 4 | 3 2 | 1 | OCTETS |
|---|---|---|---|---|---|---|---|
| MS HEADER (23 BITS) | B/H | E | PACKET TYPE | PWR | SYMMERTY | DCS | 1 |
| | RESERVED | | ARQ | | HCF | | 2 |
| | HCF | //// | //// | //// | //// | //// | 3 |
| D-CHANNEL | D-CHANNEL OR CORRELATIVE ID (1BYTE) | | | | | | 4 |
| B-CHANNEL | BEARER DATA OR SIGNALING DATA (24 BYTES FOR DATA & HIGHER LEVEL FEC) | | | | | | 5 ... 28 |
| FWC | FCW(FRAME CHECK WORD) | | | | | | 29 30 |

FIG.12B

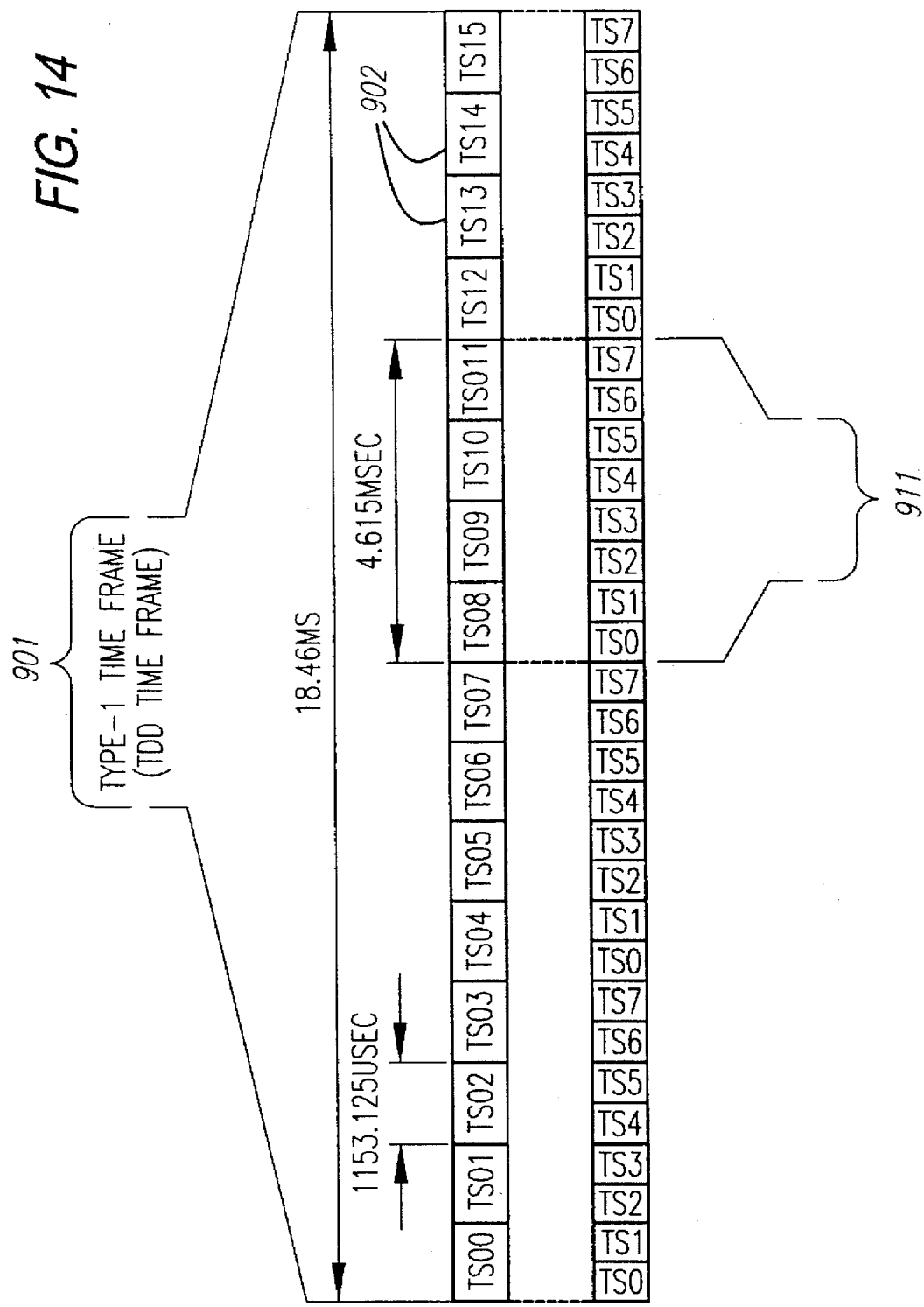

FIG. 17A

DEMAND MIGRATION TABLES
(INCLUDING BCCH CHANNEL)

TABLE 1: SLOT ALLOCATION

| OPTIONS: | 1 | 2 | 3 | 4 | 5 |
|---|---|---|---|---|---|
| GSM | 8 | 6 | 4 | 2 | 0 |
| TDD | 0 | 4 | 8 | 12 | 16 |

FIG. 17B

TABLE 2: PER 1.875 MHz (x2)*

| OPTIONS: | 1 | 2 | 3 | 4 | 5 |
|---|---|---|---|---|---|
| GSM | 24 | 18 | 12 | 6 | 0 |
| TDD | 0 | 8 | 16 | 24 | 32 |

*3 GSM RF CHANNELS / TDD RF CHANNEL PAIR

FIG. 18

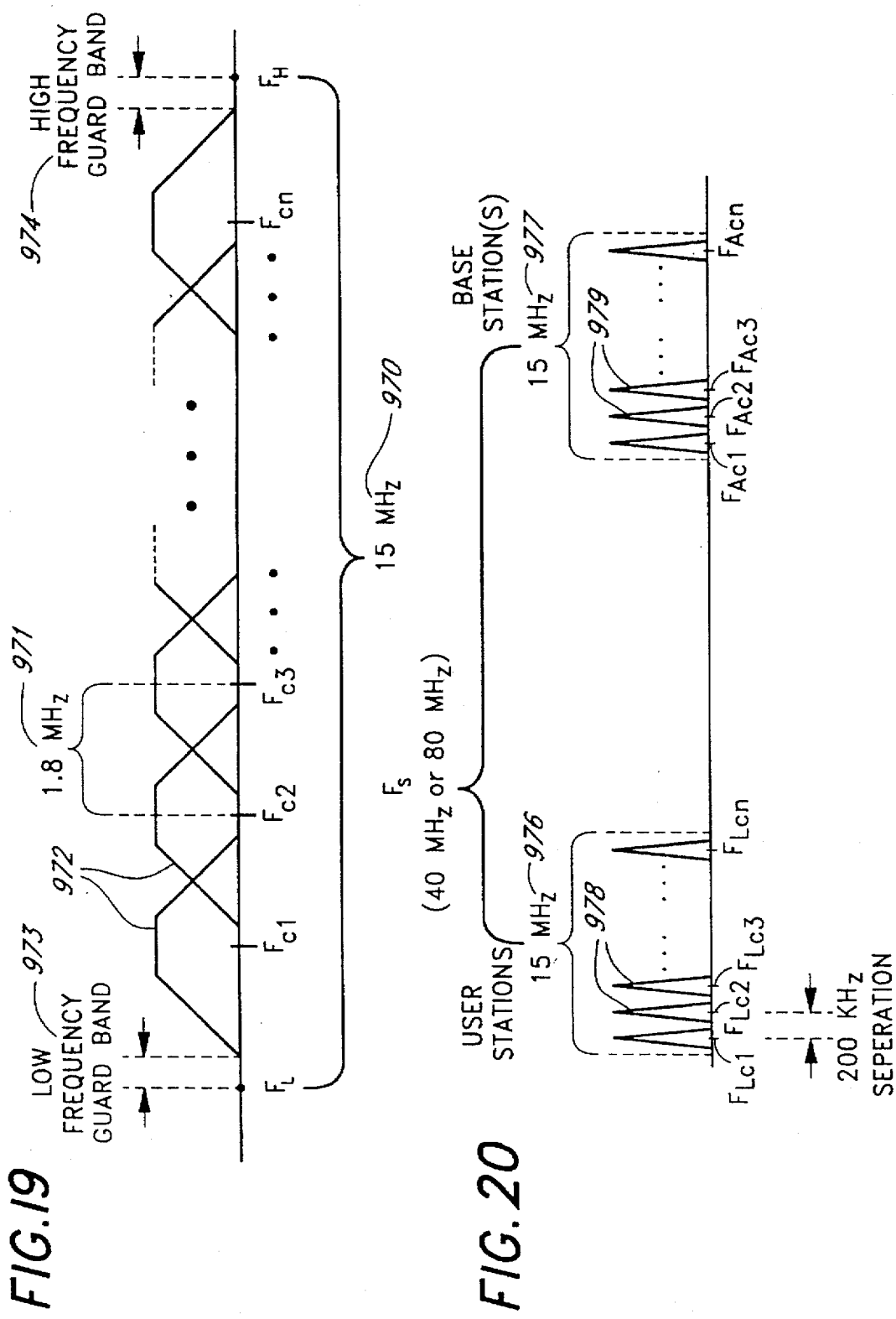

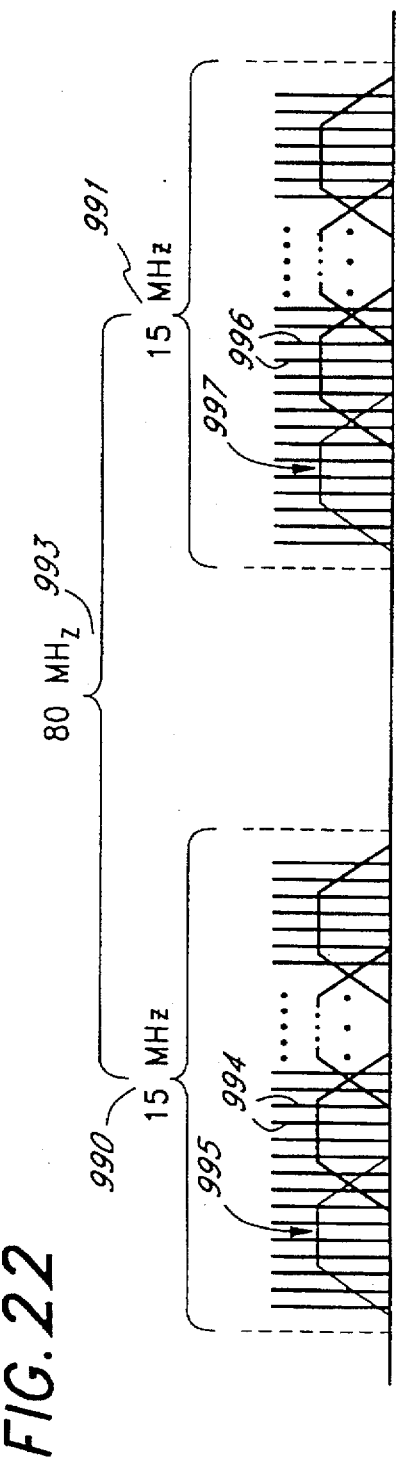
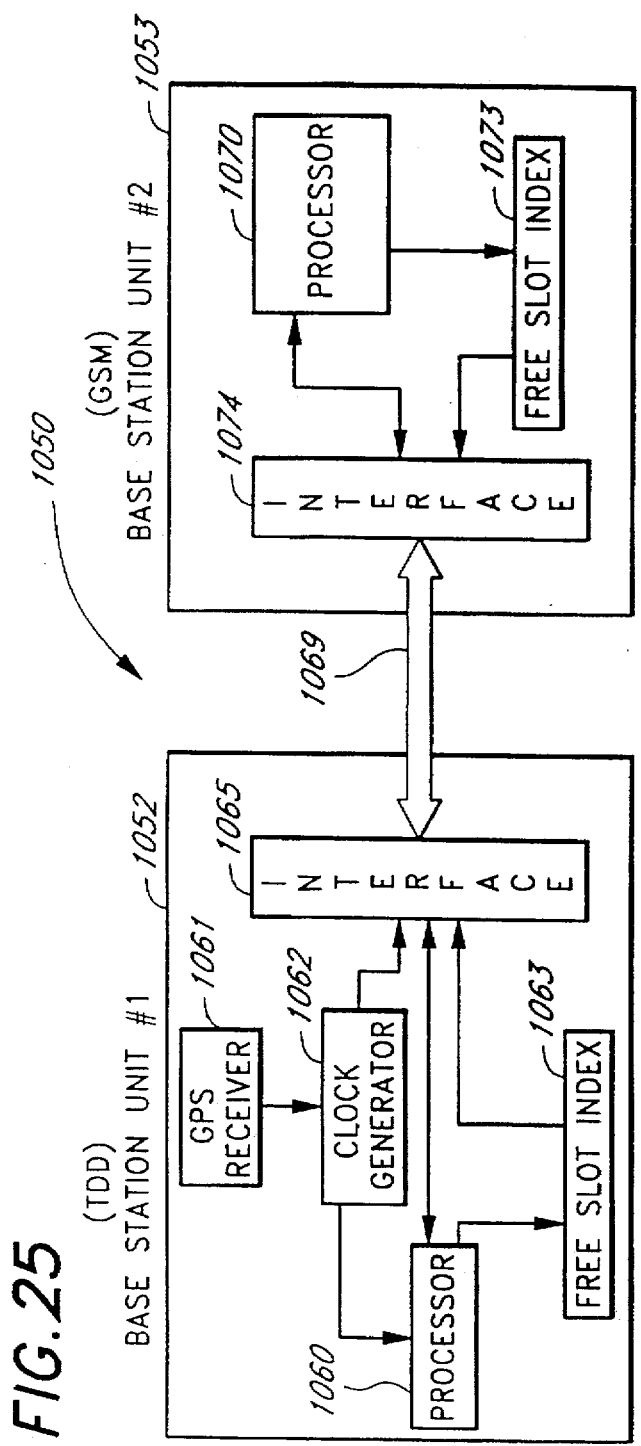
FIG. 22
FIG. 25

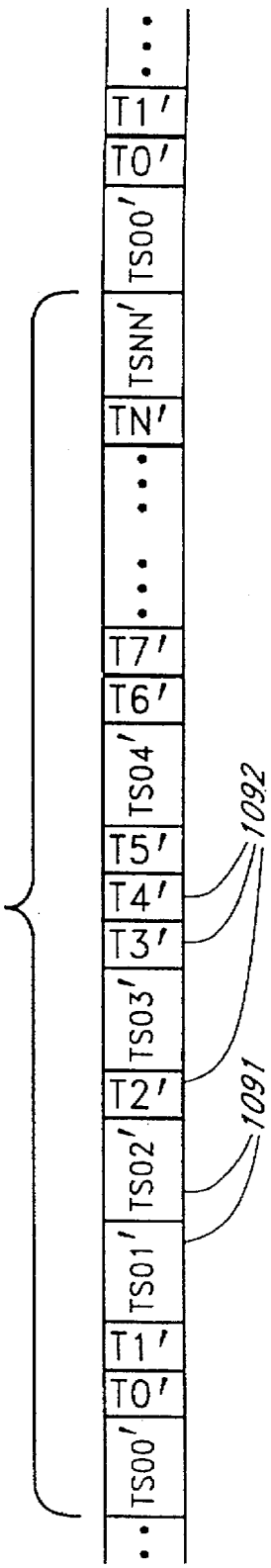
FIG. 24A
FIG. 27

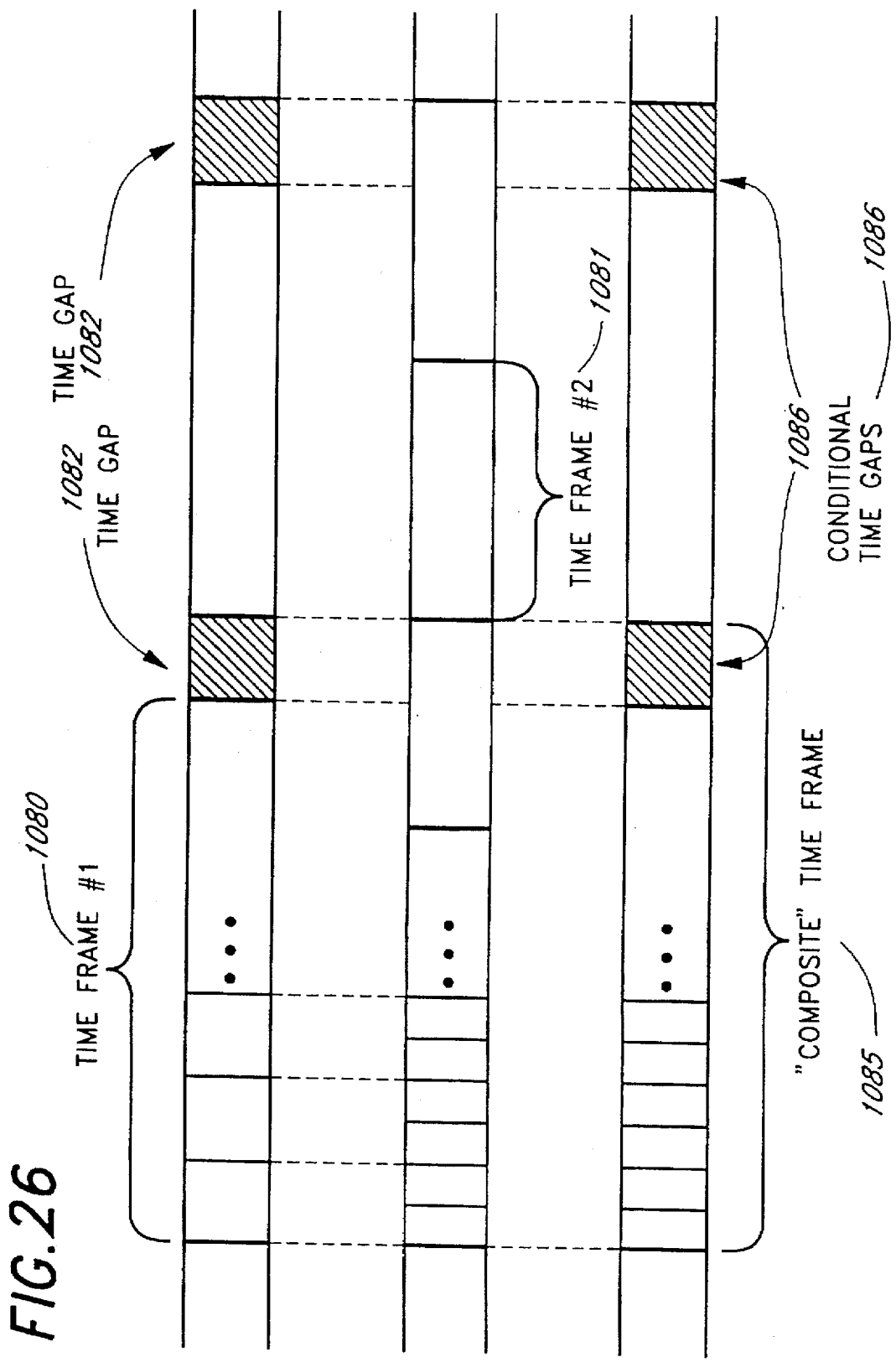

COEXISTING COMMUNICATION SYSTEMS

BACKGROUND OF THE INVENTION

1. Field of the Invention

The present invention pertains to the field of the coexistence of two different communication methods and apparatus, more specifically to the coexistence of a spread spectrum TDMA communication system with a GSM communication system.

2. Description of the Related Art

A growing demand for flexible, wireless communication has led to the development of a variety of techniques for allocating available communication bandwidth among a steadily increasing number of users of wireless services. One technique for allocating communication bandwidth between a base station and a group of user stations is through the use of time division multiple access (TDMA), wherein transmissions are separated in time to avoid conflicts. In a communication systems utilizing TDMA techniques, a repetitive time frame may be divided into a plurality of smaller time units, or time slots, and communication between base stations and user stations occur in assigned time slots.

Other techniques for allocating communication bandwidth include frequency division multiple access (FDMA), wherein transmissions take place at different frequencies, and code division multiple access (CDMA), wherein transmissions take place using different codes.

Variants of the above techniques include frequency division duplex (FDD) and time division duplex (TDD). As used herein, FDD refers to a technique for establishing full duplex communications having both forward and reverse links separated in frequency, and TDD refers to a technique for establishing full duplex communications having both forward and reverse links separated in time. Various systems using combinations of FDD, TDD, FDMA, CDMA, and/or TDMA have also been proposed.

A particular FDD/TDMA system in current use is the Global System for Mobile communications ("GSM"). According to GSM standards, communication between a base station and user stations takes place in a time frame which is divided into eight burst periods or time slots. In each of these time slots a different user station can communicate with the base station. No two user stations can communicate with the base station during the same time slot. GSM standards include the use of two distinct frequency bands. The base station transmits over the first frequency band, and the user stations transmit over the second frequency band. The user station transmission lags the base station transmission by several time slots to account for, among other things, propagation delays from the base station to the user station.

The GSM protocol provides for transmission and reception between remote devices and is generally suitable for communication at relatively high data rates. In addition to being a uniform standard in Europe, where it has been allocated a frequency band around the 1.9 GHz region, the GSM protocol has been tested, used and found to be robust, and there is a substantial installed base of devices and systems which utilize the GSM protocol in Europe. While the GSM protocol has not been allocated a specific bandwidth in the United States, it can be used in certain unlicensed bandwidths, and is a standard adopted by some telephone system operators seeking compatibility with user stations configured for GSM in Europe.

Certain other communication systems make use of a technology known as spread-spectrum communication, in which transmitted signals are spread across a frequency band which is wider than the bandwidth of the data being transmitted. In spread spectrum communication, a data signal is typically modulated with a pseudo-random chip code to generate a transmitted signal spread over a relatively wide bandwidth. The transmitted signal has a low spectral density and appears essentially as noise to those not knowing the chip code. Consequently, spread spectrum communication provides increased security of transmitted information and reduced interference with other sensitive radio equipment being used in the surrounding environment.

Due to the nature of the spread spectrum signal it is typically necessary at the receiver to despread the received spread spectrum signal to recover the original data. In one spread spectrum technique, for example, despreading of the spread spectrum signal is accomplished by correlating the received signal with a reference code matching the pseudo-noise code used in the transmitter to encode the data prior to transmission of the information. After initial correlation is achieved, it is generally necessary to maintain synchronization by tracking the incoming signal so as to keep it aligned with the local reference code. Spread spectrum communication has been implemented in a TDMA environment (see, e.g., U.S. Pat. No. 5,455,822 issued Oct. 3, 1995).

A general problem in wireless communication systems is that, because users of any one system may be mobile, they may leave the coverage region of their provider and enter a zone in which the provider does not provide coverage. For example, a user who has purchased a GSM based unit may travel to the United States and find that there is no communication system that will support the GSM based system. Likewise, a user who has purchased a unit that operates in a system configured for spread spectrum communication may travel out of the geographic region serviced by the system provider. While a user may solve this problem by having several different devices (e.g., handsets) for communication with different systems in different localities, switching between handsets may be cumbersome and inconvenient, as well as costly. Moreover, there is increasing consumer demand to provide lighter handsets of smaller size for easier storage and transportation.

The existence of a multiplicity of different communication systems, each of which may serve different and possibly overlapping geographic regions, has led and will continue to lead to the potential for redundant hardware deployment for base stations and supporting network connections, redundant user hardware, and interference among neighboring wireless providers. At the same time, the number of cellular and wireless users continues to grow, as do the demands for providing more sophisticated wireless data transfer services such as wireless facsimile and other similar services.

It would therefore be advantageous to provide a communication system providing increased user mobility between different communication systems without the need to purchase additional hardware. It would further be advantageous to provide a communication system allowing communication with users according to either of two protocols. It would further be advantageous to provide a means of integrating two communication protocols in an overlapping geographical region, while mitigating interference with users utilizing either of the two communication protocols. It would further by advantageous to provide a means for dynamically allocating communication resources to either of two different communication protocols according to user demand. It would further be advantageous to provide a communication system allowing compatibility within a geographic region of both a GSM protocol and an alternative protocol, thereby increasing the geographic mobility of users of both protocols.

SUMMARY OF THE INVENTION

The present invention comprises in certain aspects an integrated communication system supporting multiple communication protocols. In a preferred embodiment, communication is carried out according to either one of two different TDMA or TDD protocols, and includes means for selectively communicating according to either protocol. In this embodiment, each protocol defines time frames and/or time slots of a different duration, which overlap according to a predefined ratio. The integrated system is synchronized in a manner such that only one user communicates at a time and collisions are thereby avoided. The system may comprise a number of "stacked" base stations in a single cell, each operating over a different frequency or using different spreading codes. The ultimate potential user capacity is therefore a function of the number of available frequencies, time slots, and codes for a given cell.

In another aspect of the present invention, an integrated base station comprises a first base station unit operating according to a first TDMA or TDD protocol and a second base station unit operating according to a second TDMA or TDD protocol. The first base station unit and second base station unit operate in the same or overlapping geographic region, and are provided with coordinating electronics (such as GPS receiver in one or both base station units) so as to prevent collisions between communications occurring between each base station unit and its respective users. In a particular embodiment, the two base station units are collocated, and share an identical antenna or set of antennas.

According to a preferred embodiment, a first protocol is a GSM protocol, and a second protocol is a TDD protocol utilizing spread spectrum techniques. The TDD protocol is structured so that each time slot is twice the duration of a GSM time slot, and each time frame is four times the duration of a GSM time frame. The two protocols are synchronized by a common synchronization signal. For users of the TDD protocol, spread spectrum communication may be established by a user responding to a general poll transmitted during an available time slot by the TDD base station unit and by carrying out a handshake transaction. A separate control channel is provided for GSM access.

In another aspect of the invention, a composite time frame is defined with a portion of time slots of the composite time frame allocated to the first protocol and a portion of the time slots allocated to the second protocol. The time slots allocated to each protocol may or may not be contiguous. The composite time frame structure is programmed into the integrated base station so that each base station unit knows in advance the relative position of the time slots allocated to it. Each base station unit independently manages the time slots allocated to it, and independently is responsible for establishing and maintaining communication with user stations using its protocol. In another embodiment of the invention, time slots are allocated on a dynamic basis according to user demand.

Other variations and alternative embodiments are also described herein.

BRIEF DESCRIPTION OF THE DRAWINGS

The various objects, features and advantages of the present invention may be better understood by examining the Detailed Description of the Preferred Embodiments found below, together with the appended figures, wherein:

FIG. 2 is a block diagram of a communication system.

FIG. 3 is an illustration of a timing pattern according to existing GSM standards.

FIG. 4 is a block diagram of a transmitter and a receiver in a spread spectrum communication system.

FIG. 8 is a diagram illustrating a protocol for establishment of a spread spectrum communication link in a particular communication system.

FIGS. 10A–10C are diagrams of preferred polling message formats for use in the TDMA protocol related to FIGS. 9A–9C.

FIGS. 11A and 11B are diagrams of preferred message header formats for use in the TDMA protocol related to FIGS. 9A–9C.

FIGS. 12A and 12B are diagrams of a base station information packet and a user station information packet, respectively, for use in the TDMA protocol related to FIGS. 9A–9C.

FIG. 13 is a diagram of an integrated base station according to one embodiment of the present invention.

FIG. 14 is a timing diagram of a comparing the timing structure of two different communication protocols.

FIGS. 17A and 17B are demand migration tables showing, for a composite time frame, possible time slot allocations for the two communication protocols of FIG. 14.

FIG. 18 is a timing diagram showing waveforms for a slot clock and a frame clock.

FIG. 19 is a frequency channelization plan for a particular TDD communication system, and FIG. 20 is a frequency channelization plan for a GSM communication system.

FIGS. 21 and 22 are graphs showing, for a particular embodiment, a frequency channelization relationship for the communication systems having the frequency channelization plans shown in FIGS. 19 and 20.

FIG. 24A is a diagram showing a timing relationship between the time frame structure of FIG. 7 utilizing virtual time slots and the GSM time frame structure.

FIG. 25 is a diagram of an integrated base station with a dynamic slot allocation capability.

FIG. 26 is a timing diagram showing a "composite" time frame derived from the time frames of two protocols and having conditional time gaps inserted.

FIG. 27 is a diagram of a "composite" time frame comprising a plurality of time slots from two different protocols without regard to the time frame structure of the two protocols.

DETAILED DESCRIPTION OF THE PREFERRED EMBODIMENTS

Figure 1:
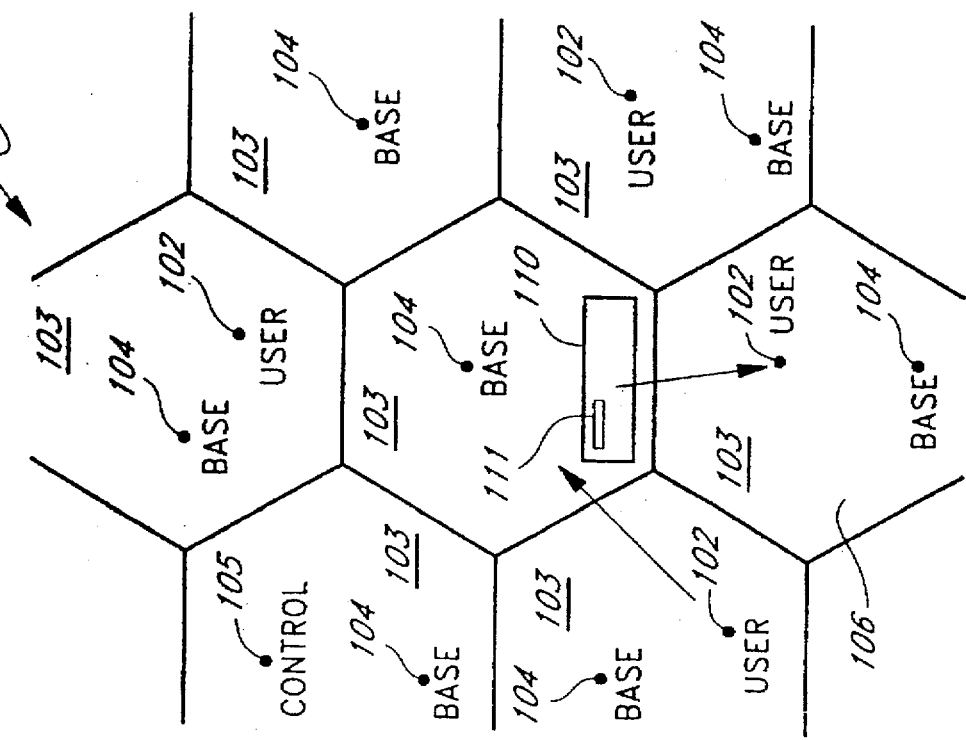
FIG. 1 is a diagram of a pattern of cells in a wireless communication system.

FIG. 1 is a diagram of a pattern of cells in a wireless communication system 101 for communication among a plurality of user stations 102. The wireless communication system 101 of FIG. 1 includes a plurality of cells 103, each with a base station 104, preferably located at or near the center of the cell 103. Each station (both the base stations 104 and the user stations 102) generally comprises a receiver and a transmitter. In a preferred embodiment, a control station 105 (sometimes referred to herein as a "base station controller"), also comprising a receiver and a transmitter, manages the resources of the system 101.

FIG. 2 is a block diagram of a communication system architecture utilized in a preferred embodiment of the present invention. The FIG. 2 communication system comprises a plurality of base stations 104 for communicating with a plurality of user stations 102. The base stations 104 and user stations 102 may operate in a personal communications system (PCS), under rules prescribed by the Federal Communications Commission (FCC).

Each base station 104 is preferably coupled to a base station controller 105 by any of a variety of communication paths 109. The communication paths 109 each comprise one or more communication links 118. Each communication link 118 may include a coaxial cable, a fiber optic cable, a digital radio link, or a telephone line. Each base station controller 105 is preferably connected to one or more communication networks 126, such as a public switched telephone network (PSTN) or personal communication system switching center (PCSC), by one or more communication paths 108, each of which may include a coaxial cable, a fiber optic cable, a digital radio link, or a telephone line.

The FIG. 2 communication system also may include one or more "intelligent" base stations 107 which connect directly to a communication network 126 without interfacing through a base station controller 105. The intelligent base stations 107 bypass the base station controllers 105 for local handoffs and switching of user stations 102, and instead perform these functions directly over the network 126.

In operation each base station 104 formats and sends digital information to its respective base station controller 105 (or directly to the network 126 in the case of an intelligent base station 107). The base station controllers 105 receive inputs from multiple base stations 104, assist handoffs between base stations 104, and convert and format channel information and signaling information for delivery to the network 126. The base station controllers 105 may also, if desired, manage a local cache VLR database, and may support basic operation, administration and management (OA&M) functions such as billing, monitoring and testing. Each base station controller 105, under control of the network 126, preferably manages local registration and verification of its associated base station 104 and may provide updates to the network 126 regarding the status of the base stations 104.

The network 126 connects to the base station controllers 105 for call delivery and outgoing calls. intelligent base stations 107 may use a predefined signaling protocol—such as ISDN messaging—for registration, call delivery and handoff over a public telephone switch. The intelligent base station 107 has all the general capabilities of a base station 104, but further may incorporate a BRI card, additional intelligence and local vocoding.

If the network 126 is a GSM network, then base stations 104 preferably connect to the network 126 through a defined "A" interface. The "A" interface may be incorporated in base station controllers 105 and in intelligent base stations 107. Features and functionality of GSM are passed to and from the base stations 104 over the "A" interface in a manner that is transparent to the end user.

The system may also interconnect to cable television distribution networks. The base stations 104 may be miniaturized so that they can be installed inside standard cable TV amplifier boxes. Interfacing may be carried out using analog remote antenna systems and digital transport mechanisms. For example, T1 and FT1 digital multiplexer outputs from the cable TV network may be used for interfacing, and basic rate (BRI) ISDN links may be used to transport digital channels.

FIG. 13 is a diagram of an integrated base station 850 (which can be either a base station 104 or an intelligent base station 107 in FIG. 2) in accordance with one embodiment of the present invention. The integrated base station 850 comprises a first base station unit 852 and a second base station unit 853. In a preferred embodiment, each base station unit 852, 853 is capable of carrying out communication with a plurality of user stations 102 according to multiple communication protocols (e.g., two protocols). In a preferred embodiment, the first base station unit 852 preferably carries out communication with a plurality of user stations 102 using a first protocol, and the second base station unit 853 preferably carries out communication with a plurality of user stations 102 using a second protocol. User stations 102 may be configured for communication using either the first protocol, the second protocol, or both protocols, as further illustrated herein.

In a preferred embodiment, the first protocol is a GSM protocol generally utilizing FDD/TDMA techniques, and the second protocol is a TDMA or TDD protocol having properties allowing it to smoothly integrate with the GSM protocol. A user station 102 desiring to communicate with the integrated base station 850 may utilize either protocol to do so (assuming channel availability). Aspects of two preferred communication protocols are described below, after which appear further details regarding the integration and coexistence of the two preferred protocols.

A first preferred protocol is the GSM protocol. FIG. 3 illustrates a timing pattern according to certain existing GSM standards. According to these standards, communication between a base station 104 and user stations 102 is divided into eight burst periods 152. Up to eight different user stations can communicate with a base station, one in each burst period 152.

GSM standards, as noted previously, include the use of two separate frequency bands. The base station 104 transmits to a user station 102 using a frequency channel on a first frequency band $F_A$, while the user stations 102 transmit using an assigned frequency channel on a second frequency band $F_B$. After a user station 102 receives a base transmission 155 on the first frequency band PA during a particular burst period 152, the user station 102 shifts in frequency by a predefined amount (e.g., 40 MHz or 80 MHz) to the second frequency band $F_B$ and transmits a user transmission 156 in response to the base transmission 155 approximately three burst periods 152 later. The three burst period delay is assumed to be large enough to account for propagation time and other delay periods between the base station 104 and the user station 102.

Each GSM burst period 152 is surrounded by guard times 157 to account for uncertain signal propagation delays between the base station 104 and the user station 102. By comparing the actual receive time of the signal from the user station 102 to the expected receive time, the base station 104 may command the user station 102 to advance or retard its transmission timing in order to fall within the proper burst period 152, a feature known as adaptive frame alignment. A specification relating to adaptive frame alignment for the GSM system is TS GSM 05.10.

A second preferred protocol is a TDD/TDMA protocol utilizing aspects of spread-spectrum technology and/or code division multiplexing, as well as frequency division multiplexing as further discussed herein. A spread-spectrum transmitter and receiver are described with respect to FIG. 4, and preferred TDD timing structures are described hereafter with respect to FIGS. 6 and 7.

FIG. 4 is a block diagram of an exemplary transmitter and receiver in a spread spectrum communication system as may be employed for spreading and despreading signals in a spread spectrum communication system. In FIG. 4, a spread-spectrum transmitter 201 comprises an input port 202 for input data 203, a chip sequence transmitter generator 204, a modulator 205, and a transmitting antenna 206 for transmitting a spread-spectrum signal 207. A spread-spectrum receiver 208 comprises a receiver antenna 209, a chip sequence receiver generator 210, a demodulator 211, and an output port 212 for output data 213. In operation, a single chip sequence 214 is identically generated by both the transmitter generator 204 and the receiver generator 210, and appears essentially random to others not knowing the spreading code upon which it is based. The spread-spectrum signal 207 is despread with demodulator 211 by correlating the received signal with a locally generated version of the chip sequence 214. Exemplary correlators are described in, e.g., U.S. Pat. Nos. 5,022,047 and 5,016,255, each of which are incorporated by reference as if fully set forth herein. A preferred method for despreading and correlating spread spectrum signals is described in U.S. patent application Ser. No. 08/481,613 filed Jun. 7, 1995, which is hereby incorporated by reference as if set forth fully herein.

Where spread spectrum communication is used, the control station 105 (see FIG. 1) assigns the base station 104 transmitters and user station 102 transmitters in each cell 103 a spread-spectrum code for modulating radio signal communication in that cell 103. The resulting signal is generally spread across a bandwidth exceeding the bandwidth necessary to transmit the data, hence the term "spread spectrum". Accordingly, radio signals used in that cell 103 are spread across a bandwidth sufficiently wide that both base station 104 receivers and user station 102 receivers in an adjacent cell 103 may distinguish communication which originates in the first cell 103 from communication which originates in the adjacent cell 106.

Figure 5:
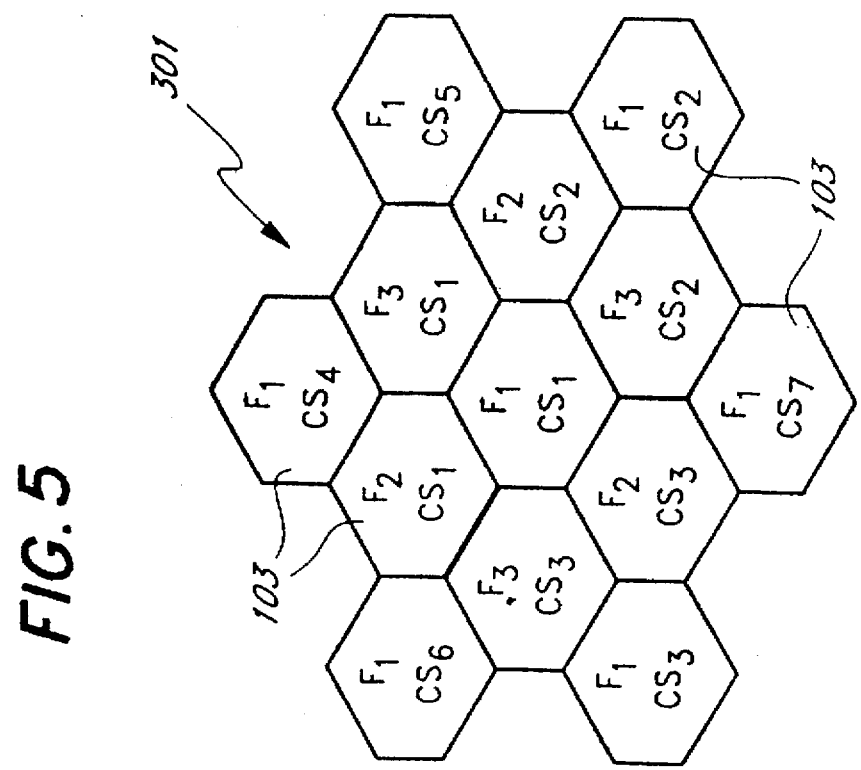
FIG. 5 is a diagram of an arrangement of cells in a wireless communication system showing an exemplary code and frequency reuse pattern.

FIG. 5 is a diagram of a preferred cellular environment in which the spread spectrum protocol operates. In FIG. 5, a geographical region 301 is divided into a plurality of cells 103. Associated with each cell 103 is an assigned frequency and an assigned spread spectrum code. Preferably, three different frequencies (or frequency groups) F1, F2 and F3 are assigned in such a manner that no two adjacent cells have the same assigned frequency (or frequency group) F1, F2 or F3, thereby minimizing interference between adjacent cells.

To further reduce the possibility of intercell interference, different near-orthogonal spread spectrum codes C1 through C7 are assigned as shown in a repeating pattern overlapping the frequency reuse pattern. Although seven spread spectrum codes C1 through C7 are shown in FIG. 5, a pattern involving other numbers of spread spectrum codes may be suitable depending upon the particular application.

The use of spread spectrum for carrier modulation permits a very efficient frequency reuse factor of N=3 for allocating different carrier frequencies F1, F2 and F3 to adjacent cells 103. Interference between cells 103 using the same carrier frequency F1, F2 or F3 is reduced by the propagation loss due to the distance separating the cells 103 (no two cells 103 using the same frequency F1, F2 or F3 are less than two cells 103 in distance away from one another), and also by the spread spectrum processing gain of cells 103 using the same carrier frequencies F1, F2 or F3, obtained by the use of orthogonal or near-orthogonal spreading codes.

Figure 6:
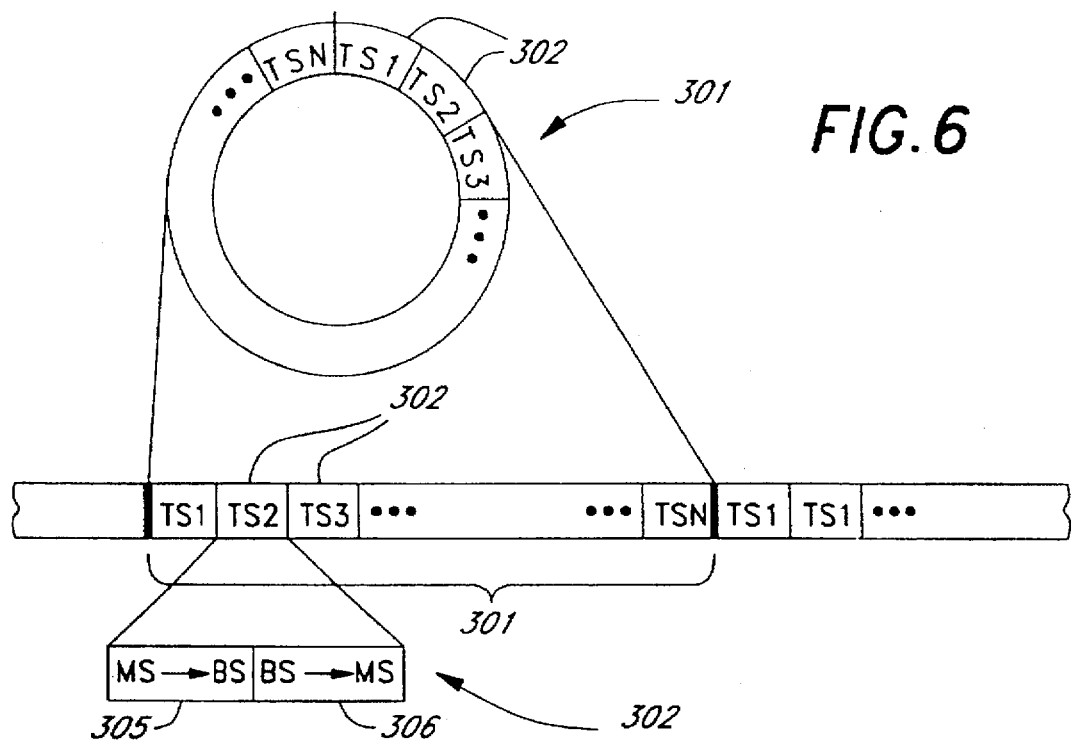
FIG. 6 is a diagram of a time frame divided into a plurality of time slots.

FIG. 6 is a diagram showing a preferred timing structure for a TDD system. According to the timing structure of FIG. 6, communication over time is broken into a continuous series of time frames 301. A single complete time frame 301 is shown along a timeline 310 in FIG. 6; similar time frames precede and follow time frame 301 in a continuous pattern along the timeline 310.

Time frame 301 is divided into a plurality of time slots 302 numbered consecutively TS1, TS2 ... TSN, each of which may support duplex communication with a user station 102. Time frame 301 may be thought of as a "polling loop" or a time loop, as depicted in FIG. 6, whereby a base station 104 communicates with user stations 102 sequentially over the time frame 301 in a manner analogous to polling, each user station 102 transmitting and receiving messages in its designated time slot 302. In the FIG. 6 embodiment, each time slot 302 comprises a user segment 305, wherein a user station 102 transmits a user-to-base message to the base station 104, and a base segment 306, wherein the base station 104 transmits a base-to-user message to the user station 102. Communication in time slots 302 may be interleaved, such that user stations 102 transmit in one physical time slot 302 but receive in a different physical time slot 302 (such as described with respect to the FIG. 7 timing structure elsewhere herein).

In an preferred TDD communication system in accordance with FIG. 6, time frames 301 are each 18.46 milliseconds in duration, and each time frame 301 comprises sixteen time slots 302 or, alternatively, eight time slots 302 to support extended range through increased guard times. If sixteen time slots 302 are used, the time slots 302 are preferably each 1153.125 microseconds in duration.

In some embodiments, a user station 102 may communicate in more than one time slot 302 in each time frame 301, so as to support an increased data rate. Similarly, in some embodiments, a user station 102 may periodically skip time frames 301 and communicate in a subset of all time frames 301 (e.g., every other time frame 301, or every fourth time frame 301), so as to support a reduced data rate where a full speed communication link is not necessary. Further information about an exemplary TDMA system supporting variable data rates may be found in copending U.S. patent application Ser. No. 08/284,053 filed Aug. 1, 1994, which application is hereby incorporated by reference as if fully set forth herein.

Figure 7:
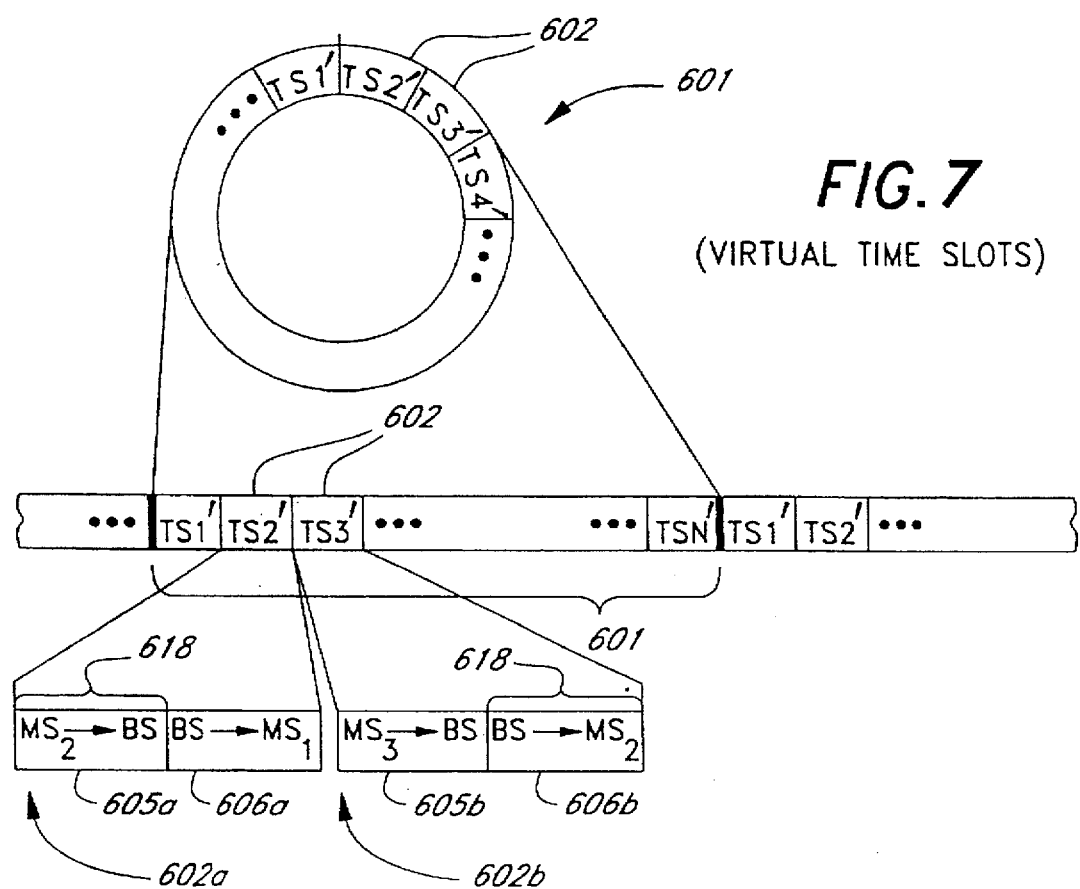
FIG. 7 is a diagram of an alternative timing structure showing a time frame divided into a plurality of virtual time slots.

FIG. 7 is a diagram of an alternative preferred timing structure employing virtual time slots, each of which generally comprises a duplex pair of communication links (i.e., one forward link and one reverse link).

In FIG. 7, similar to FIG. 6, communication over time is broken into a continuous series of time frames 601. A single complete time frame 601 is shown along a timeline 610 in FIG. 7; similar time frames precede and follow time frame 601 in a continuous pattern along the timeline 610.

Time frame 601 is divided into a plurality of physical time slots 602 numbered consecutively TS1', TS2'... TSN'. Each physical time slot 602 comprises a user segment 605 wherein a user station 102 transmits a user-to-base message to the base station 104, and a base segment 606 wherein the base station 104 transmits a base-to-user message to a user station 102, which could be a different user station 102 than transmitted to the base station 104 in the same physical time slot 602. Using virtual time slots, communication in physical time slots 602 may be interleaved, such that a user station 102 transmits in one physical time slot 602 but receives in a different physical time slot 602. The user segment 605 and base segment 606 which define the forward link and reverse link transmissions to a given user station 102 (and which are typically located in different physical time slots 602) are referred to as a virtual time slot.

An exemplary virtual time slot 618 is shown in FIG. 7, associated with a particular user station 102 (e.g., user station MS2). The virtual time slot 618 comprises two message segments, one in each of two physical time slots 602a and 602b. Virtual time slot 618 has a user segment 605a in the first physical time slot 602a, and a base segment 606b in the second physical time slot 602b. Between the user segment 605a and the base segment 606b of the virtual time slot 618, the base station 104 transmits in a base segment 606a of the first physical time slot 602a (e.g., to a second user station 102, such as user station MS1), and another user station 102 (e.g., a third user station 102, such as user station MS3) transmits in a user segment 605b to the base station 104. In this manner, transmissions to and from the base station 104 are interleaved.

Time frame 601 may be thought of as a "polling loop" or a time loop, similar to time frame 301 of the FIG. 6 embodiment, whereby a base station 104 communicates with user stations 102 sequentially over the time frame 601 in a manner analogous to polling, each user station 102 transmitting and receiving messages in its designated virtual time slot 618. The virtual time slots 618 of FIG. 7, however, are not necessarily identical to the physical time slots 602. An advantage of the FIG. 7 timing structure is that it generally provides extended time for the base station 104 to process channel characterization data received from the user station 102.

In an exemplary TDMA communication system, time frames 601 are each 18.46 milliseconds in duration, and each time frame 601 comprises sixteen time slots 602 or, alternatively, eight time slots 602 to support extended range through increased guard times. If sixteen time slots 602 are used, the time slots 602 are preferably each 1153.125 microseconds in duration.

In some embodiments, a user station 102 may communicate in more than one virtual time slot 618 in each time frame 601, so as to support an increased data rate. Similarly, in some embodiments, a user station 102 may periodically skip time frames 601 and communicate in some subset of all time frames 601 (e.g., every other time frame 601, or every fourth time frame 601), so as to support a reduced data rate where a full speed communication link is not necessary.

Communication between a user station 102 and a base station 104 is established in one embodiment by a response from a user station 102 to a general polling message sent from the base station 104 during an available time slot 302. This process is described in more detail with reference to FIG. 8, which illustrates a protocol for establishment of a spread spectrum communication link in, e.g., the FIG. 6 communication system. A communication link may be established in an analogous manner for the FIG. 7 embodiment.

In the FIG. 8 protocol, messages (base transmissions 306 and user transmissions 305) are generally one of three types: a general poll message 401, a specific poll message 402, or an information message 403. When a message is transmitted by a user station 102, it may be referred to herein as a "response", e.g., a general poll response 404, a specific poll response 405, or an information response 406.

A general poll message 401 is transmitted by the base station 104 in each time slot 302 available for communication. A user station 102 seeking to establish communication monitors transmissions from a base station 104 and ascertains available time slots 302 by receiving general poll messages 401 in those time slots 302.

A user station 102 "acquires" a base station 104 by a sequence of handshaking steps. At a general poll step 407, the base station 104 transmits a general poll message 401 during an unoccupied time slot 302. The user station 102 receives the general poll message 401 and, if it was received without error, transmits a general poll response 404 to the base station 104 in the same time slot 302 of the following time frame 301. The general poll message 401 comprises a field for a base ID 408b, which may be 32 bits long, and which may be recorded by the user station 102. Similarly, the general poll response 404 comprises a field for a user ID 409, which is preferably 72 bits long, and which may be recorded by the base station 104.

Upon receiving a general poll response 404, at a specific poll step 410, the base station 104 transmits a specific poll message 402, comprising the user ID 409 received by the base station 104 as part of the general poll response 404. The user station 102 receives the specific poll message 402 and, if it was received without error and with the same user ID 409, transmits its specific poll response 405 to the base station 104 in the same time slot 302 of the following time frame 301. The specific poll response 405 comprises the same user ID 409 as the general poll response 404.

In a particular embodiment, the specific poll message 402 may be eliminated as redundant. The user station 102 may therefore follow the general poll response 404 with a specific poll response 405.

Upon receiving a specific poll response 405 comprising a user ID 409 which matches that of the general poll response 404, at a link-established step 411, the base station 104 may transmit a traffic message 403. At this point, the base station 104 and user station 102 have established a communication link 412. The base station 104 may couple a telephone line to the communication channel, and the user station 102 may begin normal operation on a telephone network (e.g., the user station 102 may receive a dial tone, dial a number, make a telephone connection, and perform other telephone operations). The base station 104 and user station 102 may exchange traffic messages 403 and 406, until the communication link 412 is voluntarily terminated, until faulty communication prompts the user station 102 to re-acquire the base station 104, or until handoff of the user station 102 to another base station 104.

Should more than one user station 102 respond to the same general poll message 401, the base station 104 may advertently fail to respond. The lack of response from the base station 104 signals the involved user stations 102 to back off for a calculated time interval before attempting to acquire the same base station 104 using the general poll message 401 and general poll response 404 protocol. The back-off time may be based upon the user ID 409, and therefore each user station 102 will back off for a different length of time to prevent future collisions.

When an incoming telephone call is received at a base station 104, at an incoming-call step 413, the base station 104 transmits a specific poll message 402 with the user ID 409 of the indicated recipient user station 102 (skipping the general poll message 401 and the general poll response 404) on an available time slot 302. Each user station 102 listens regularly for the specific poll message 402, as further described herein, so as to receive the specific poll message 402 within a predetermined time after it is transmitted. When the specific poll message 402 is received, the user station 102 compares the user ID 409 in the message with its own user ID, and if they match, continues with the link-established step 411. The base station 104 may thus establish a communication link 412 with any user station 102 within communication range.

Further details regarding means for establishing communication (particularly spread spectrum communication) in a TDMA system may be found in U.S. Pat. No. 5,455,822 and in copending U.S. patent application Ser. No. 08/284,053 filed Aug. 1, 1994, both of which are hereby incorporated by reference as if fully set forth herein.

In a preferred embodiment, the general poll message 401 comprises a slot pointer (e.g., in slot pointer field 810 shown in and described hereafter with respect to FIG. 11A) which indicates the next time slot 302 (or virtual time slot 618) during which the next general poll message 401 will be transmitted by the base station 104. A user station 102 seeking to establish communication responds to the general poll message 401 not necessarily in the same time slot of the next time frame 301 (or 601), but in the user segment 305 (or 605) of the time slot 302 (or 618) indicated by the slot pointer. Upon receiving a general response message 404 from the user station 102 in the time slot indicated by the slot pointer, the base station 102 responds with a specific poll message 402. Should more than one user station 102 respond to a general poll message 401, the appearance of a general poll message 401 (rather than a specific poll message 402) in the time slot indicated by the slot pointer will cause each user station 102 involved to back off for a variable period of time depending on the user station ID.

The specific poll message 402 comprises a temporary shorthand identifier (nickname) specific to the user station 102 and known as a correlative ID. The correlative ID appears in future signaling messages (in both directions) until the established link is dropped. In response to the specific poll message 402, the user station 102 responds with a traffic message in a time slot 302 (or 618) assigned by a slot pointer in the header of the specific poll message 402.

Figure 9A:
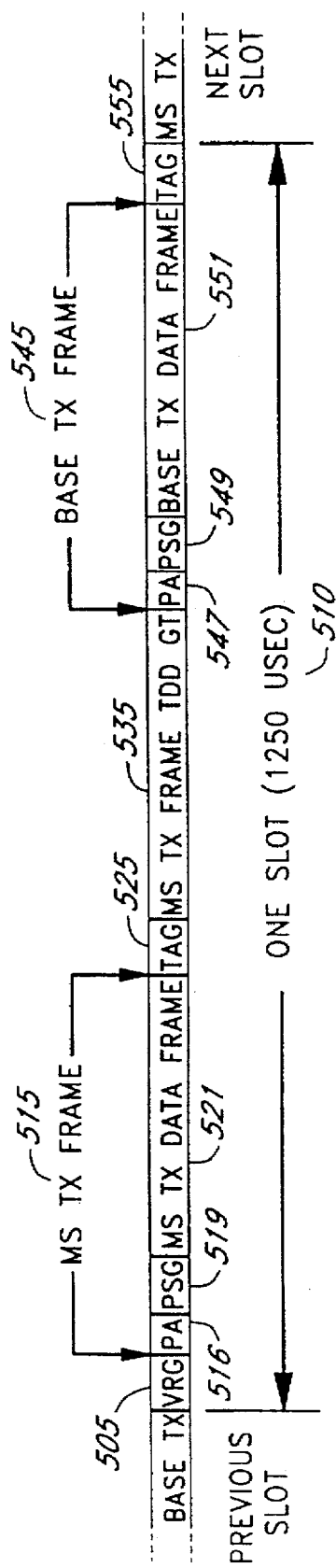
FIG. 9A is a diagram of a preferred slot structure for a time slot according to a particular TDMA protocol.
Figure 9B:
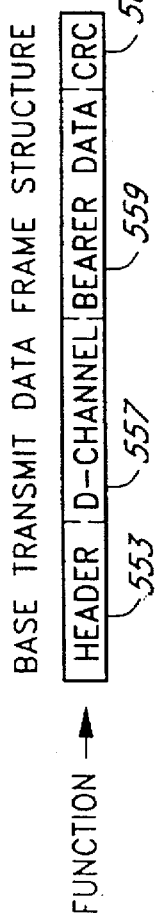
FIGS. 9B and 9C are diagrams of a base station traffic message structure and a user station traffic message structure, respectively, in the same TDMA protocol.
Figure 9C:
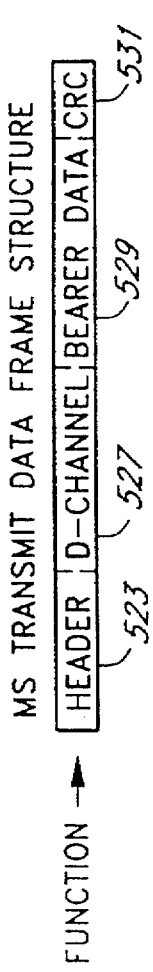

FIG. 9A is a diagram of a preferred slot structure, and FIGS. 9B and 9C are diagrams of a base station traffic message structure and a user station traffic message structure, respectively. In FIG. 9A, a time slot 510 comprises a variable radio delay gap 505, a user station transmit frame 515, a user station turn-around gap 525, a guard time 535, a base station transmit frame 545, and a base station turn-around gap 555. Each user station transmit frame 515 comprises a user preamble 516, a user preamble sounding gap 519, and a user station data frame 521. Similarly, each base station transmit frame 545 comprises a base preamble 547, a base preamble sounding gap 549, and a base transmit data frame 551.

FIG. 9B illustrates a preferred message structure for the base transmit data frame 551. The message structure of FIG. 9B comprises a base header field 553, a base D-channel field 557, a base data field 559, and a base cyclical redundancy check (CRC) field 561. In a preferred embodiment, the base header field 553 is 23 bits, the base D-channel field 557 is 8 bits, the base data field 559 is 192 bits, and the base CRC field 561 is 16 bits.

FIG. 9C illustrates a preferred message structure for the user station transmit data frame 521. The message structure of FIG. 9C comprises a user header field 523, a user D-channel field 527, a user data field 529, and a user CRC field 531. In a preferred embodiment, the user header field 523 is 17 bits, the user D-channel field 527 is 8 bits, the user data field 529 is 192 bits, and the user CRC field 531 is 16 bits.

In a preferred embodiment, a time slot 301 comprises 3125 chip periods (where each chip period is equal to about 0.369 microseconds); the user transmit frame 515 and the base transmit frame 545 are 519.552 microseconds (1408 chips in duration) and 531.36 microseconds (1440 chips in duration), respectively; the user station turn-around gap 525 is 10.7 microseconds (29 chips in duration); the guard time 535 is 66.4 microseconds (180 chips in duration); and the base station turn-around gap 555 is 25.1 microseconds (68 chips in duration). The effective gap time is 72.3 microseconds, corresponding to a non-interfering base-station-to-base-station range of about 13.5 miles. The bearer channel (i.e., user data field 529) supports a rate of 10,400 bits/second, and the D-channel 527 supports a data rate of 433.33 bits/second.

FIGS. 10A-10C are diagrams of preferred polling message formats. FIG. 10A is a diagram of a general poll message format (such as for general poll message 401 of FIG. 8). The general poll message 701 preferably comprises, in the following sequence, a header field 702, a spare field 703, a zone field 704, a base station controller (BSC) ID field 705, a base ID field 706, a facility field 707, a system type field 708, a service provider field 709, a slot quality field 710, a forward error correction (FEC) field 711, and a frame control word (FCW) field 712. In a preferred embodiment, the header field 702 is 23 bits long, the spare field 703 is 16 bits long, the zone field 704 is 40 bits long, the BSC ID field 705 is 16 bits long, the base ID field 706 is 32 bits long, the facility field 707 is 32 bits long, the system type field 708 is 8 bits long, the service provider field 709 is 16 bits long, the slot quality field 710 is 8 bits long, the FEC field 711 is 32 bits long, and the frame control word field 712 is 16 bits long, for a total of 239 bits.

The header field 702 identifies the message type and is described more fully with respect to FIG. 11A. The zone field 704 identifies the paging zone of the specific base station 104. A user station 102 may move from one base station 104 service area to another in the same zone without requiring immediate re-registration. The BSC ID field 705 is a sequence uniquely identifying the base station controller 105. The base ID field 706 is a sequence uniquely identifying the base station 104. The facility field 707 describes the services offered by the base station 104 (e.g., ethernet access, aggregate data capability, enhanced voice, etc.). The facility field 707 may include a sub-field indicating which user stations 102 are permitted access to the channel (e.g., 911 calls only, or user stations 102 with specific access codes). The system type field 708 identifies the type of system associated with the base station 104. The service provider field 709 identifies the PCS service provider that operates the base station 104. The slot quality field 710 indicates the relative quality of the time slot in terms of interference. Generally, the lower the number, the better the slot quality. The FEC field 711 is used for forward error correction. The FCW field 712 is used for error detection, and in one embodiment comprises a sequence determined according to following algorithm:

1. Calculate remainder R1 of a seed polynomial SDP modulo-2 divided by a generator polynomial GRP;
2. Calculate product P of $x^{16}$ and content of the message 701 preceding FCW field 710;
3. Calculate remainder R2 of the generator polynomial GNP modulo-2 divided by the product P derived in Step 2;
4. Calculate modulo-2 sum S of remainder R1 and remainder R2; and
5. Calculate the ones-complement of sum S the result of which is transmitted in the FCW field 710.

In a preferred embodiment, the seed polynomial SDP is:

$$x^k(x^{15}+x^{14}+x^{13}+x^{12}+x^{11}+x^{10}+x^9+x^8+x^7+x^6+x^5+x^4+x^3+x^2+x^1+1)$$

and the generator polynomial GRP is:

$$X^{16}+X^{12}+X^5+1$$

FIG. 10B is a diagram of a specific poll message format (such as for specific poll message 402 of FIG. 8). The specific poll message 720 preferably comprises, in the following sequence, a header field 721, a correlative ID field 722, a cause field 723, a personal identifier (PID) field 724, an over-the-air (OTA) map type field 725, an OTA map field 726, a spare field 727, a slot quality field 728, a forward error correction field 729, and an FCW field 730. In a preferred embodiment, the header field 721 is 23 bits long, the correlative ID field 722 is 8 bits long, the cause field 723 is 8 bits long, the PID field 724 is 72 bits long, the OTA map type field 725 is 8 bits long, the OTA map field 726 is 32 long, the spare field 727 is 32 long, the slot quality field 728 is 8 bits long, the FEC field 729 is 32 long, and the FCW field 729 is 16 bits long, for a total of 239 bits.

The header field 721, slot quality field 728, FEC field 729, and FCW field 730 are similar to the analogous fields described for FIG. 10A. The correlative ID field 722 is used to temporarily identify one or more channels (i.e., time slots) as being allocated to a specific user station 102. A correlative ID number is assigned for the duration of a call connection and is released for reuse by another user station 102 at the termination of a connection; the correlative ID number may also be changed during a connection. A specific correlative ID number may be reserved by the base station 104 for broadcast use. The cause field 723 indicates the cause of an error occurring during execution of a previous signaling traffic operation for the particular user station 102. Interpretation of the cause field 723 message may therefore depend upon the type of signal traffic involved. Possible cause messages include, for example, those indicating that the user station 102 is unregistered or will not be accepted for registration, or that the call has not been connected or cannot be completed. The PID field 724 comprises a personal identification number which uniquely identifies the subscriber (e.g., user station 102). The OTA map type field 725 defines the type of map (e.g., superframe, subframe, etc.) that follows in the OTA map field 72G. The OTA map field 726 describes the mapping of time slots relative to a particular user station 102. The format of the OTA map field 726 depends on the map type.

FIG. 10C is a diagram of a poll response message format (such as for general poll response 404 or specific poll response 405 of FIG. 8). The poll response message 740 preferably comprises, in the following sequence, a header field 741, a first spare field 742, a PID field 743, a service provider field 744, a class field 745, a user capabilities field 746, a second spare field 747, an FEC field 748, and an FCW field 749. In a preferred embodiment, the header field 741 is 17 bits long, the first spare field 742 is 16 bits long, the PID field 743 is 72 bits long, the service provider field 744 is 16 bits long, the class field 745 is 16 bits long, the user capabilities field 746 is 16 bits long, the second spare field 747 is 32 long, the FEC field 748 is 32 bits long, and the FCW field 749 is 16 bits long, for a total of 233 bits.

The header field 741 identifies the message type and is more fully described in FIG. 11B. The PID field 743, FEC field 748, and FCW field 746 are similar to the PID field 724, FEC field 729, and FCW field 730, respectively, described with respect to FIG. 10B. The service provider field 744 identifies the PCS service provider that the user station 102 wishes to use. The class field 745 specifies some of the operational parameters being used by the particular user station 102. The class field 745 may comprise a class type sub-field and a class information sub-field. The class type sub-field indicates the user station class type (e.g., GSM or DCS1900 class type, IS-41 class type, etc.). The class information sub-field provides operational information including, for example, revision level, available encryption algorithms, short message capability, ellipsis notation and phase-2 error handling capability, power class, continuous/discontinuous transmission, bandwidth (e.g., 20 MHz or 25 MHz), and nominal power levels. The user capabilities field 746 identifies the features present in the user station 102 (e.g., whether the user station 102 can receive a fax or data connection, whether the user station 102 is capable of ciphering, etc.).

FIGS. 11A and 11B are diagrams of preferred polling message header formats. FIG. 11A is a diagram of a polling message header format for a base polling message (such as general poll message 401 or specific poll message 402 of FIG. 8). The polling message header 801 comprises a base/mobile indicator (B/M) flag 802, an extended protocol (E) flag 803, a packet type field 804, a power adjustment (PWR) field 805, a symmetry field 806, a D-channel suppression (DCS) flag 807, a virtual slot (VS) flag 808, a slot or channel utilization (CU) field 809, a slot pointer field 810, a error check and correct (ARQ) field 811, and a header frame control word (HCF) field 812. In a preferred embodiment, the B/M indicator flag 802, E flag 803, PWR field 805, DCS flag 807, and the VS flag 808 are each 1 bit long, the packet type field 804 and symmetry field are each 2 bits long, the CU field 809 and ARQ field are each 3 bits long, and the slot pointer field 810 and header HCF field 812 are each 4 bits long, for a total of 23 bits. A twenty-fourth bit of the header 801 is "lost" in establishment of the RF link due to the use of differential phase encoding to transmit six bits of data per symbol code.

The B/M indicator flag 802 indicates whether the originator of the message is a user station 102 or the base station 104. The E flag 803 is used to indicate whether or not an extended protocol is in use. The packet type field 804 specifies which of four packet types is being used, according to Table 8-1A below.

TABLE 8-1A

| Packet Field | Packet Type |
|---|---|
| 00 | Normal traffic |
| 01 | Specific poll |
| 10 | Control (signaling), traffic |
| 11 | General poll, or general response |

The packet type field 804 also provides an indication of the usage of the D-field 557, according to Table 8-1B below.

TABLE 8-1B

| Packet Field | D-Field Usage |
|---|---|
| 00 | D-Channel |
| 01 | Correlative ID |
| 10 | Correlative ID |
| 11 | Reserved |

The PWR field 805 is a serialized bit stream from the base station 104 to the user station 102 allowing control of the power level of the user station 102 transmitter. As each base-to-user message is received at the user station 102, the PWR bit from the last message is analyzed along with the current PWR bit to determine if the power level of the user station 102 transmitter should be raised, lowered or remain unchanged. Power control action therefore requires that at least two consecutive base-to-user messages be received by the user station 102 before any action is taken. The action taken is dictated according to Table 8-2 appearing below.

TABLE 8-2

| Last Bit | Current Bit | Action |
|---|---|---|
| 0 | 0 | Decrease transmitter power |
| 1 | 1 | Increase transmitter power |
| 0 | 1 | Leave power unchanged |
| 1 | 0 | Leave power unchanged |
| missing | any | Leave power unchanged |
| any | missing | Leave power unchanged |

The amount of power increase or decrease carried out in response to receiving commands in the PWR field 805 may be a fixed or preset amount—e.g., 1 dB for each time frame 301 (or more frequently if the user station 102 is transmitting in multiple time slots 302 per time frame 301). Using only a single bit for the PWR field 805 saves space in the header 553 of the base-to-user message. Performance is adequate because the quality metrics generally provide sufficient feedback to allow small power adjustment steps over time, but not sufficient feedback to have confidence in making substantial power adjustment steps. However, because only one user station 102 transmits in a given time slot 302 within the general geographic region of a particular base station 104, strict power control of the user stations 102 is not required to avoid intercell interference as it is with CDMA systems not employing time division techniques.

The symmetry field 806 is used by the base station 104 to grant bandwidth to the user station 102. The bandwidth grant applies to the next time slot 302 (or 618) in the channel. The symmetry field 806 contents may be interpreted according to Table 8-3 below.

TABLE 8-3

| Symmetry Bits | Meaning |
|---|---|
| 00 | Symmetric bandwidth grant. Each direction has been granted one half of the bandwidth. |
| 01 | The maximum bandwidth has been granted to the user station 102, and the minimum bandwidth has been granted to the base station 104. |
| 10 | The maximum bandwidth has been granted to the base station 104, and the minimum bandwidth has been granted to the user station 102. |
| 11 | Broadcast mode. The entire bandwidth has been granted to the base station 104. There is no user station 102 packet. |

The DCS flag 807 indicates the usage of the D-channel for the current message. The DCS flag 807 is set to one value to indicate that the D-channel is disabled to reserve it for use by the application using the bearer channel (B-channel), and is set to another value to indicate that the D-channel is enabled for other usage. The VS flag 808 indicates whether the base station is using a virtual slot mode. If the virtual slot mode is active (e.g., the time slot structure of FIG. 6 is used), then all user station 102 transmissions occur one time slot earlier than if the VS mode is inactive.

The CU field 809 indicates the relative slot utilization for the base station 104. In a preferred embodiment, the CU field contents are defined according to Table 8-4 below.

TABLE 8-4

| CU Field Contents | Utilization |
|---|---|
| 000 | No channels available: Find another base station |
| 001 | One channel available: 911 calls only |
| 010 | Two channels available: 911 calls or handover only |
| 011 | Few channels available: Class control is in effect for registrations and originations |
| 100 | Nearly full: Access Unrestricted |
| 101 | Moderately full: Access Unrestricted |
| 110 | Partially full: Access Unrestricted |
| 111 | All slots available: Access Unrestricted |

Where class control is in effect for registrations and call originations, access leveling and load leveling classes may be identified in the facility field 707 of the general poll message (see FIG. 10A).

The slot pointer field 810 contains an index which identifies the next time slot to be used in the current base/user packet exchange. The user station 102 must transmit in the indicated time slot to continue the exchange. In a particular embodiment, the contents of the slot pointer field 810 may take on any of sixteen different values (e.g., binary 0 to 15), with each value indicating a number of time slots from the present time slot in which the user station 102 is to transmit. For example, a value of zero means that the user station 102 is to transmit in the same slot (in the next frame if at a regular bandwidth rate, or several frames in the future if using a sub-frame rate). A value of one means that the user station 102 is to transmit in the next time slot of the present time frame. A value of two means that the user station 102 is to transmit in the time slot two places ahead in the present time frame, and so oil.

The ARQ field 811 allows the receiving entity (either base station 104 or user station 102) to correct a message error.

The ARQ field 811 comprises three subfields of one bit each: (1) an "ARQ required" sub-field that indicates whether or not ARQ is required for the message sent; (2) an "ACK" sub-field indicating whether or not the sender of the message received correctly the last message sent; and (3) a "message number" sub-field, which indicates the message number (zero or one) of the current message. The ACK sub-field and message number sub-field are preferably always used regardless of whether the ARQ required bit is set.

If ARQ is required (as determined by the value of the ARQ required bit), then the receiving entity performs the following steps:

(1) Compares the message number sub-field of the received message with the message-number sub-field of the previously received message; if they are the same, the new message is ignored.

(2) Checks the ACK sub-field of the received message. If the value is NAK (indicating that the sender of the message did not receive the last message correctly), then the receiving entity resends the old data message; otherwise, it sends a new data message.

(3) Complements the message number sub-field bit each time a new data message is sent.

(4) If a message is received with a FCW error (as explained with respect to FIG. 10A), or did not receive a message at all, then the receiving entity resends the old data message with the ACK sub-field set to NAK.

The header HCF field 812 is used for a cyclic redundancy check calculated over the 12 preceding bits (i.e., the preceding bits of the message header).

FIG. 11B is a diagram of a polling message header format for a poll response message (such as general poll response or specific poll response 405 of FIG. 8). The polling response header 820 comprises a base/mobile indicator (B/M) flag 821, an extended protocol (E) flag 822, a packet type field 823, a PWR field 824, a symmetry field 825, a DCS flag 826, a spare field 827, an ARQ field 828, and a header frame control word (HCF) field 829. In a preferred embodiment, the B/M indicator flag 821, E flag 822, and DCS flag 826 are each 1 bit long, the packet type field 823, symmetry field 825, and spare field 827 are each 2 bits long, the ARQ field 828 is 3 bits long, and the HCF field 829 is 4 bits long, for a total of 17 bits. An eighteenth bit is "lost" in the establishment of the RF link due to the use of differential phase encoding to transmit six bits per symbol code.

The B/M indicator flag 821, E flag 822, packet type field 823, PWR field 824, DCS flag 826, ARQ field 828 and HCF field 829 are used for the same purposes as their counterpart fields in the base station header shown in FIG. 11A. The contents of the symmetry field 825 in the user station 102 header may be interpreted according to Table 8-5 below.

TABLE 8-5

| Symmetry Field | Meaning |
| --- | --- |
| 00 | Symmetric bandwidth is requested for the next time slot |
| 01 | Maximum bandwidth is requested for the next time slot |
| 10, 11 | (Not presently used) |

FIG. 12A is a diagram of a base station information packet showing in octet format fields generally depicted in FIGS. 9B and 11A. FIG. 12B is a diagram of a user station information packet showing in octet format fields generally depicted in FIGS. 9C and 11B.

Data may be transmitted between the base station 104 and user stations 102 using an M-ary spread spectrum technique. Suitable M-ary spread spectrum transmission and reception techniques are described in, e.g., U.S. Pat. No. 5,022,047 and in U.S. patent application Ser. No. 08/484,007 filed Jun. 7, 1995, both of which are incorporated by reference as if set forth fully herein. In a preferred embodiment, the base station 104 and user stations 102 each transmit an M-ary direct sequence spread spectrum signal, with M=6, using spread spectrum codes (called "symbol codes") of 32 chips. Thirty-two different symbol codes are used to represent up to thirty-two different data symbols, each comprising five bits of data; phase encoding is also preferably used to allow transmission of a 6th bit of data for each symbol code. Techniques of phase encoding for transmission of an additional bit of information per symbol code are described in, e.g., U.S. patent application Ser. No. 08/484,007.

Because the base header field 553 is positioned first in the base transmit data frame 551, it loses the first bit from the first transmitted data symbol (which is transmitted using a differential encoding technique). Thus the base header field 553, which comprises four data symbols, is 23 bits in length. The first symbol comprises five data bits, and the latter three symbols each comprises six data bits. Likewise, because the user header field 523 is positioned first in the user transmit data frame 521, it loses the first bit from the first transmitted data symbol. Thus the user header field 523, which comprises three symbols, is 17 bits in length. The first symbol comprises five data bits, and the latter two symbols each comprises six data bits.

User stations 102 in one embodiment may comprise mobile handsets capable of multi-band and/or multi-mode operation. The user stations 102 may be multi-mode in that they may be capable of both spread spectrum (i.e., wideband) communication and also narrowband communication. The user stations 102 may be multi-band in the sense that they may be set to operate on a plurality of different frequencies, such as frequencies in either the licensed or unlicensed PCS bands. The user stations 102 may operate in one mode (e.g., wideband) over a first frequency band, and another mode (e.g., narrowband) over a second frequency band.

As an example, a user station 102 may be set to operate on a plurality of frequencies between 1850 and 1990 MHz, with the frequencies separated in discrete steps. Each user station 102 may be equipped with a frequency synthesizer that can be programmed to allow reception and/or transmission on any one of the plurality of frequencies. In a particular embodiment, the programmable frequency steps are in 200 KHz increments (for GSM or narrowband communication) or 1.8 MHz increments (for spread spectrum communication) within the GSM frequency bands. The user station 102 may also be configured to operate in the isochronous band between 1920 and 1930 MHz, having a first channel centered at 1920.625 MHz, and channel spacing of 1.25 MHz across the remainder of the isochronous band.

Further information regarding dual-mode and dual-band communication is set forth in U.S. patent application Ser. No. 08/483,514 filed on Jun. 7, 1995, which is hereby incorporated by reference as if set forth fully herein.

In one embodiment, channel information is monitored to assist the base station 104 in selecting an antenna for communication with a user station 102. The channel information can also permit the base station 104 to adjust its own output power and that of the user station (s) 102.

Time division duplex permits common antennas to be used for transmit and receive functions at both the base station 104 and the user stations 102, typically without the need for antenna diplexers. Common antennas can be used to transmit and receive because these functions are separated in time at each of the user stations 102 and base stations 102. The use of common antennas results in simplicity of the base station 104 and user station 102 terminal designs.

A base station 104 preferably includes a plurality of base station antennas providing antenna diversity. The base station 104 includes electronics for selecting the best antenna to be used for communication with each user station 102 during each time slot 302. The base station 104 may receive a user transmission (such as a user-to-base message sent during a user segment 305 of a time slot 302) simultaneously (with possible variations due to reflection or multi-path effects) on each of a plurality of base station antennas. Each base station antenna connects to an individual base station receiver which analyzes the quality of the received user transmission and provides quality metrics to a processor in the base station 104. The base station 104 compares the quality metrics produced by each base station receiver and selects the best quality receiver output signal. In this manner, the most appropriate base station antenna is selected for each user station 102. The metrics from the selected receiver output signal provide a characterization of the communication channel between the base station 104 and the particular user station 102.

When the base station 104 transmits to a particular user station 102, it selects the most appropriate base station antenna for transmission. An antenna and a transmission power level are preferably selected so as to match the characteristics of the transmission channel from the base station 104 to the user station 102. The base station 104 may select as its transmitting antenna the same base station antenna selected to receive the user transmission 305. Because the base station 104 can both receive and transmit on the antenna having the best received signal quality from the user station 102, the user station 102 benefits from antenna diversity even if it does not have multiple antennas. Because the base station 104 transmits very quickly after receiving the user transmission, there is little time lag, so that the channel characteristics do not change significantly before the base station 104 makes its transmission.

During each subsequent time slot 302 assigned to a particular user station 102 in the polling loop 301, the base station 104 again selects an antenna and power level for a base station transmission (such as a base-to-user message transmitted during a base segment 306 of a time slot 302) based on channel characterization data derived from the most closely preceding user station transmission.

The base station 104 preferably controls its output power on a slot-by-slot basis. To do so, the base station 104 preferably has means to determine the power setting of the user station 102. However, because a single base station 104 can communicate during a polling loop 301 with a large number of user stations 102, each of whose distance from the base station 104 can vary from near zero up to the radius of the cell 103, control of the base station transmitter output power so as to maintain a near-constant received power level at each user station 102 during each time slot 302 may not be practical, largely due to the fact that large changes (e.g., more than 40 dB) in base station transmit output power would be necessary each time slot 302 (e.g., about every 1153 μs). As an alternative to providing power control on a time slot 302 by time slot 302 basis, output power control at the base station 104 can instead be averaged over a longer time interval than each time slot 302.

In response to receiving a user station transmission during the user segment 305 a time slot 302, the base station 104 determines the quality of the received signal including, for example, the received power and the signal-to-noise or interference ratio. During the subsequent base segment 306 in the latter part of the time slot 302, the base station 104 in one embodiment sends a message to the user station 102 indicating the signal quality received by the base station 104, and commanding the user station 102 to adjust its power if needed. Based on the quality of the received signal, the base station 104 in one embodiment commands the user station 102 to change (increase or decrease) its transmit power by some discrete amount (e.g., in minimum steps of 3 dB) relative to its current setting, until the quality of the user transmissions received by the base station 104 is above an acceptable threshold. A preferred means of power control is described with respect to the PWR field 805 appearing in FIG. 8A.

A preferred power adjustment command from the base station 104 to the user station 102 is encoded according to Table 8-2 appearing earlier herein. Although preferred values are provided in Table 8-2, the number of power control command steps and the differential therebetween may vary depending upon the particular application and the system specifications.

While the above power adjustment and antenna diversity techniques have generally been described with respect to features appearing in the FIG. 6 embodiment, the described techniques are equally applicable to the FIG. 7 embodiment.

Aspects of the invention are directed to facilitating rapid control traffic within the timing structure of the communication system. Handover, establishing communication, or time slot interchange may be carried out in a rapid manner by utilizing multiple time slots spaced less than one time frame apart. In such a manner, the control traffic takes advantage of unused time slots to avoid having to wait an entire time frame for each opportunity to exchange messages between the base station 104 and the user station 102 desiring a transaction. Spare resources are thereby used for the purpose of speeding up control traffic transactions.

In the preferred embodiment wherein the user station 102 transmits prior to the base station 104 in a time slot 302 (or virtual time slot 618), the slot pointer allows the user station 102 to have knowledge of the next available time slot 302. Otherwise, the user station 102 may not necessarily know until a general poll message 401 is received whether or not a particular time slot is available for communication, and then would typically have to wait an entire polling loop before responding to the general poll message 401.

Knowledge of available time slots 302 is also passed to the user station 102 in a specific poll message 402 by use of the OTA map field 726. As noted previously, the OTA map field 726 describes the mapping of time slots relative to a particular user station 102. Thus, for a time frame 301 with sixteen time slots 302, the OTA map field 726 in one embodiment comprises sixteen bits. Each bit may be set to a first value (e.g., "1") to indicate that the time slot 302 associated with that bit is unavailable, and to a second value (e.g., "0") to indicate that the time slot 302 associated with that bit is available for communication. Preferably, the time slot usage is indicated from a standpoint relative to the current time slot 302 of the user station 302—that is, the first bit is associated with the immediately following time slot, the second bit with the next time slot thereafter, the third bit with the next time slot thereafter, and so on. Alternatively, the time slot usage may be indicated from a standpoint with respect to a fixed reference, such as the start of the time frame 301, in which case the user station 302 needs to have available as information the relative starting point of the time frame 301.

FIG. 13 is a block diagram of an integrated base station 850 in accordance with one embodiment of the present invention. Integrated base station 850 comprises a first base station unit 852 operating according to a first TDMA or TDD protocol, and a second base station unit 853 operating according to a second TDMA or TDD protocol. The first base station unit 852 and second base station unit 853 preferably operate in the same or overlapping geographic region. The first base station unit 852 and second base station unit 853, while shown as separate blocks in FIG. 13, may be physically located within the same unit. Alternatively, they may be at separate physical locations but nevertheless nearby one another.

The first base station unit 852 comprises a processor 860, a global positioning satellite (GPS) receiver 861, a clock generator 862, and a free slot index 863. The second base station unit 853 comprises a processor 870 and a free slot index 873. The first base station unit 852 communicates with the second base station unit 853 over communication lines 869. If the first base station unit 852 and second base station unit 853 are collocated, they may share the same antenna or set of antennas (not shown).

In a preferred embodiment, the first base station unit 852 communicates according to the communication protocol generally described with respect to FIG. 6 (or FIG. 7, and including FIGS. 8 through 12B; hereinafter collectively referred to as "the FIG. 6 communication protocol", or "the TDD protocol of FIG. 6", or simply "the TDD protocol"), and the second base station unit 853 communicates according to a GSM protocol. In one aspect of the invention, interference between transmissions to and from the first base station unit 852 and the second base station unit 853 are avoided by separating the communications in time according to a predefined timing pattern.

More specifically, communication to and from each of the base station units 852, 853 is carried out according to a timing pattern encompassing one or more time frames of each of the communication protocols. Such a timing pattern is hereinafter generally referred to as a composite time frame, as more fully explained further herein. Exemplary composite time frames are shown in FIGS. 15 and 16.

Figure 15:
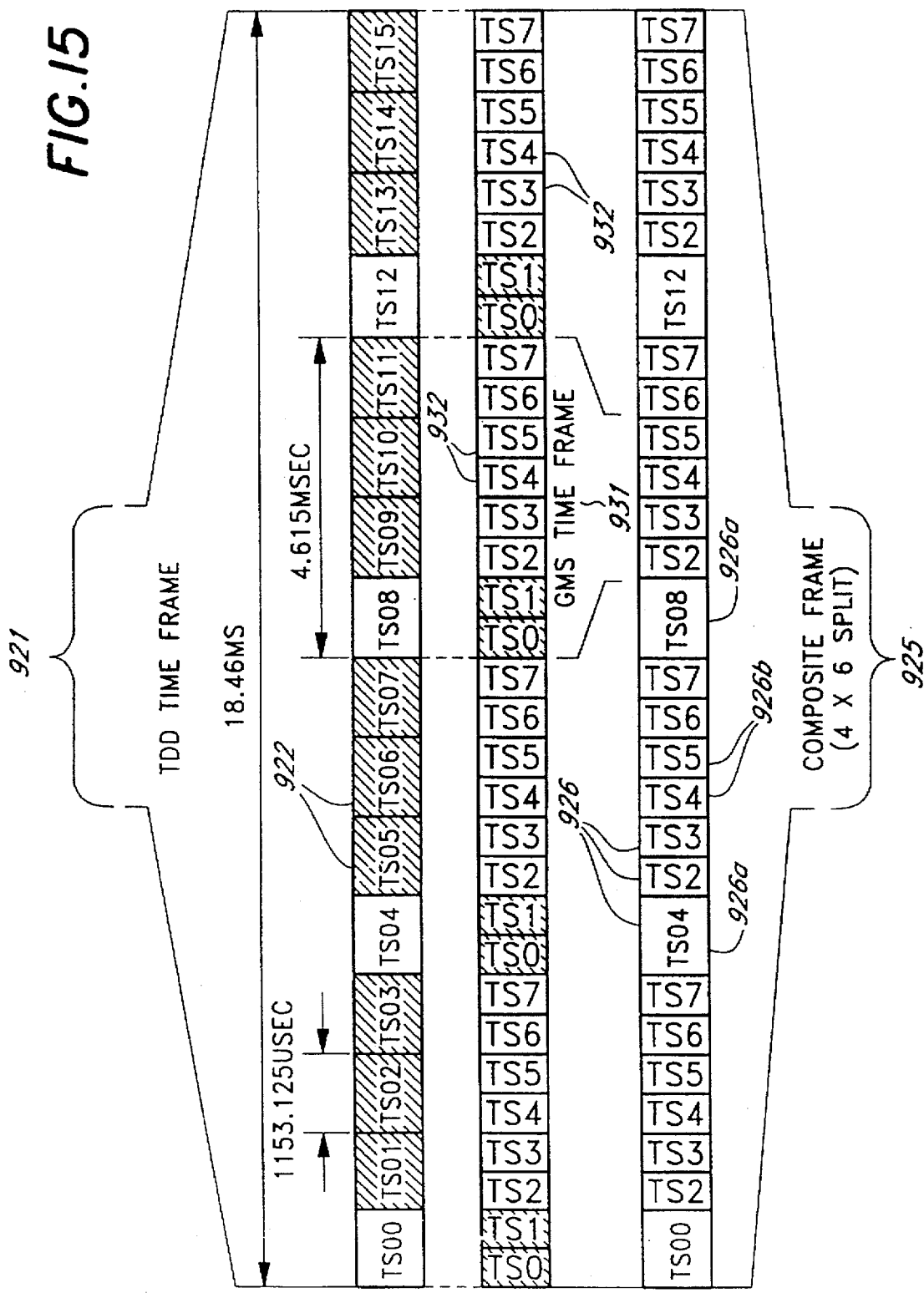
FIG. 15 is a timing diagram of a composite time frame shown relative to the timing structure of the communication protocols of FIG. 14.
Figure 16:
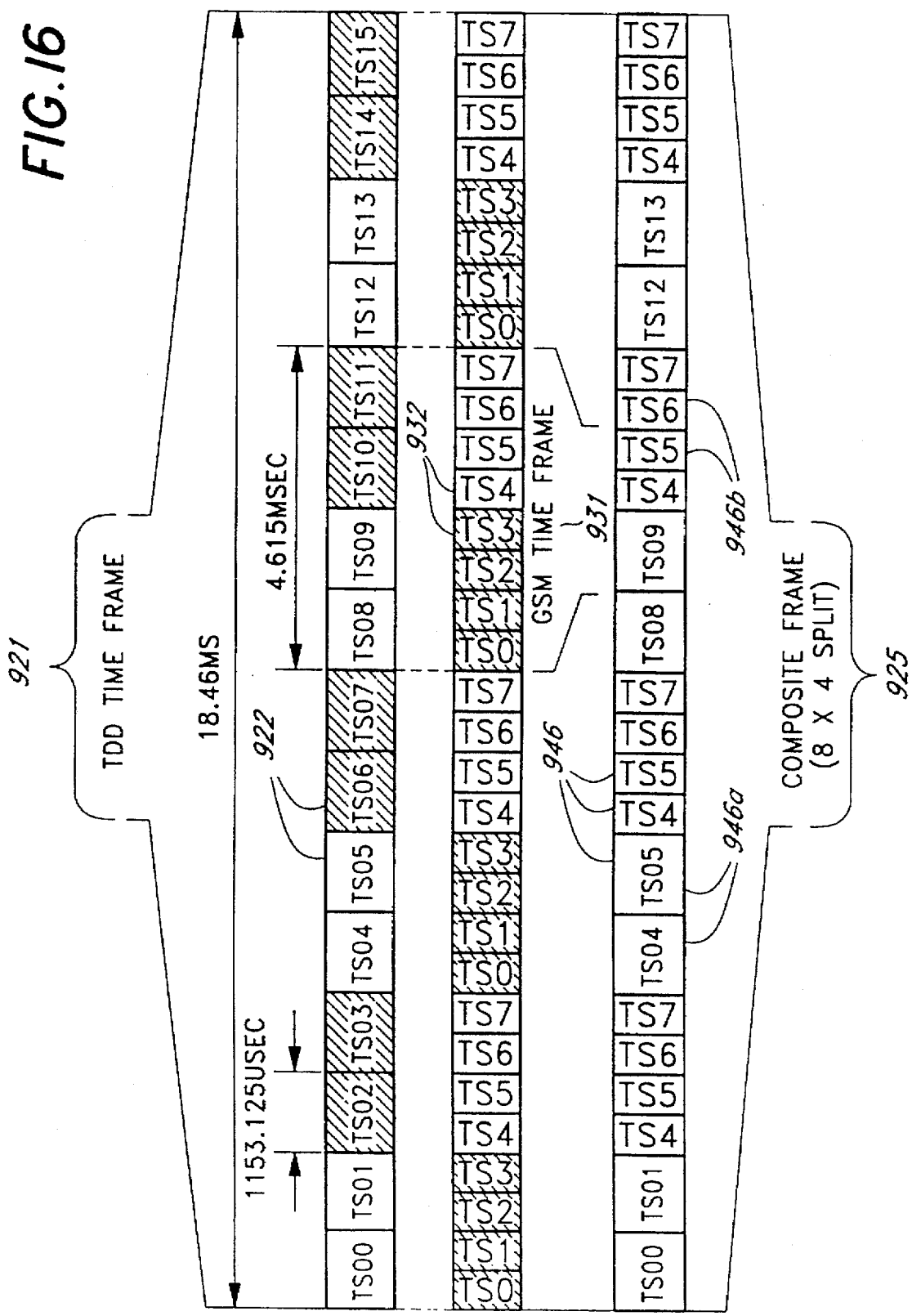
FIG. 16 is a timing diagram of a different composite time frame shown relative to the timing structure of the communication protocols of FIG. 14.

In each of the composite time frames of FIGS. 15 and 16, in general, a portion of the composite time frame is divided into time slots for use with a first protocol, and the remaining portion of the composite time frame is divided into time slots for use with a second protocol. FIG. 14 is a diagram comparing time frames of two different protocols, from which the composite time frames of FIGS. 15 and 16 are derived. In FIG. 14, a first time frame 901, designated a "Type-1" time frame, is shown. The first time frame 901 comprises a plurality of time slots 902. Also shown in FIG. 14, along a similar time axis, is a second time frame 911, designated a "Type-2" time frame. The second time frame 911 also comprises a plurality of time slots 912. In FIG. 14, the time slots 902 of the first time frame 901 are designated by "TS" followed by two digits (e.g., TS00, TS01, TS02 , . . . , TS15), while the time slots 912 of the second time frame 911 are designated by "TS" followed by a single digit (e.g, TS1, TS2, TS3 , . . . , TS7). It should be noted that the time slots FIG. 14 are numbered starting with "0" or "00", while in the FIG. 6 and 7 drawings the time slots are numbered starting with "1"; no implication by the particular starting reference numeral selected for a particular drawing is intended.

In a preferred embodiment, the first time frame 901 is defined as part of a protocol for TDD communication and, more particularly, the TDD protocol of FIG. 6. In the same preferred embodiment, the second time frame 911 is defined as part of the GSM protocol, as previously described with respect to FIG. 3. In a preferred embodiment, the first time frame 901 has a duration of 18.46 milliseconds, and the second time frame 911 has a duration of 4.615 milliseconds. Accordingly, four of the second time frames 911 in the aggregate have the same duration as a single first time frame 901. In a preferred embodiment, each of the time slots 902 of the first time frame 901 has a duration of 1153.125 microseconds, and each of the time slots 912 of the second time frame 911 has a duration of 576.92 microseconds. Accordingly, two of the latter time slots 912 in the aggregate have the same duration as a single of the first time slots 902.

In one embodiment of the invention as illustrated in FIG. 15, a composite time frame 925 is defined with a portion of the composite time frame 925 time allocated to the first protocol, and a portion of the composite time frame 925 allocated to the second protocol. In FIG. 15 thus is shown the first time frame 921 (i.e., time frame 901 of FIG. 14) having time slots 922 which are unshaded to indicate their incorporation into the composite time frame 925, and shaded to indicate their exclusion from the composite time frame 925. Similarly is shown in FIG. 15 a set of the second time frames 931 (i.e., time frames 911 of FIG. 14) having time slots 932 which are unshaded to indicate their incorporation into the composite time frame 925, and shaded to indicate their exclusion from the composite time frame 925. The composite time frame 925 therefore comprises a plurality of different length time slots 926, some of which are time slots 926a corresponding to time slots 922 of the first time frame 921, and some of which are time slots 926b corresponding to the time slots 932 of the second time frame 931.

In FIG. 15, the composite time frame 925 comprises four time slots 926a corresponding to the first time frame 921 (i.e., time slots TS00, TS04, TS08, and TS12), and six time slots 926b corresponding to the second time frame 931 (i.e., time slots TS2 through TS7). Because of the timing relationship between the first time frame 921 and the second time frame 931, the first time slots 926a of the composite time frame 925 each appear once, and the second time slots 926b of the composite time frame 925 each appear four times (because the first time frame 921 covers four of the second time frames 931 in relative duration).

Because time division communication according to both the first and second protocols are by their nature periodic, and because the first time frame 921 in this embodiment covers four times the duration of the second time frame 931, the different sized time slots 926a, 926b of the composite time frame 925 will be interspersed according the periodic appearance of specific time slot channels taken from time frames 911 and 931.

The particular composition of the composite time frame 925—i.e., the ratio of the first time slots 926a to the second time slots 926b, and the specific order thereof-can be matched to the specific system needs. Where more users are likely to use the first protocol (associated with the first time frame 921), more of the time slots 926a associated with that protocol may be included in the composite time frame 925. Conversely, where more users are likely to use the second protocol (associated with the second time frame 931), then more of the time slots 926b may be included in the composite time frame 925.

FIG. 16 is a diagram of another composite time frame 945 having a different arrangement of time slots 946, each of the time slots 946 corresponding to time slots 922 or 932 of the first time frame 921 and second time frame 931. As with FIG. 15, time slots 922 of the first time frame 921 are unshaded to indicate their incorporation into the composite time frame 945, and shaded to indicate their exclusion from the composite time frame 945; similarly time slots 932 from the set of the second time frames 931 are unshaded to indicate their incorporation into the composite time frame 945, and shaded to indicate their exclusion from the composite time frame 945. The composite time frame 945 therefore comprises a plurality of different length time slots 946, some of which are time slots 946a corresponding to time slots 922 of the first time frame 921, and some of which are time slots 946b corresponding to the time slots 932 of the second time frame 931.

In FIG. 16, the composite time frame 945 comprises eight time slots 926a corresponding to the first time frame 921 (i.e., time slots TS00, TS01, TS04, TS05, TS08, TS09, TS12 and TS13), and four time slots 926b corresponding to the second time frame 931 (i.e., time slots TS4 through TS7). Because of the timing relationship between the first time frame 921 and the second time frame 931, the first time slots 926a of the composite time frame 945 each appear once, and the second time slots 926b of the composite time frame 945 each appear four times (because the first time frame 921 covers four of the second time frames 931 in relative duration).

Thus, by comparing the different arrangement of time slots 926 and 946 in the composite time frames 925 and 945 from FIGS. 15 and 16, respectively, it is apparent that different ratios of time slots may be used according to, for example, differing system requirements. Thus, in FIG. 15, the composite time frame 925 can support up to four users of the first time slots 926a and six users of the second time slots 926b. In FIG. 16, the composite time frame 945 can support up to eight users of the first time slots 946a and four users of the second time slots 926b.

FIG. 17A is a demand migration table showing how the ratio of number of supportable users of each protocol changes as the number of allocated time slots changes. The first row 950 of the demand migration table of FIG. 17A corresponds to supportable users of the second protocol (i.e., the GSM protocol), and the second row 951 corresponds to supportable users of the first protocol (i.e., the TDD protocol of FIG. 6). Five different pairing options 954 are provided for in the demand migration table of FIG. 17A, each with a different ratio of supportable GSM protocol users 952 to supportable TDD protocol users 953. As shown in FIG. 17A, under a first pairing option 954, eight GSM protocol users 952 can be supported with zero TDD protocol users 953 supported in a composite time frame; under a second pairing option 954, six GSM protocol users 952 can be supported with four TDD protocol users 953 supported in a composite time frame; under a third pairing option 954, four GSM protocol users 952 can be supported with eight TDD protocol users 953 supported; and so on. As the number of supportable users of one protocol increases, then the number of supportable users of the other protocol decreases, since the allocation of time slots to one protocol necessarily reduces the number of allocable time slots for the other protocol.

While the embodiments shown in FIGS. 15 and 16 have composite time frames 925 and 945 each the same length as the longer of the two time frames 921 and 931 from which they are derived, the present invention is not limited to such an arrangement. In general, the composite time frame should be of a duration sufficient to fit an integral number of both the first and second time frames from which the composite time frame is derived. Thus, for example, a composite time frame may be selected to be, e.g., 60 milliseconds, where the first time frame duration is 12 milliseconds and the second time frame is 20 milliseconds. The 60 millisecond composite time frame duration in such a case conveniently represents the shortest duration fitting an integral number of both a set of the first time frames and a set of the second time frames.

Where there is no such convenient shortest length for a composite time frame (as may commonly occur when the first and second protocols are independently developed for different communication systems by different parties), time gaps may be inserted so that an integral number of each time frame fits within the composite time frame. FIG. 26 is a diagram of a composite time frame 1085 illustrating such an arrangement. In FIG. 26, a series of first time frames 1080 having a first time frame duration are shown relative to a series of second time frames 1081 having a second time frame duration. The series of first time frames 1080 are separated by time gaps 1082 of a duration selected so that two of the second time frames 1081 have the same duration as a single first time frame 1080 plus the time gap 1082. The composite time frame 1085 is constructed in the same manner as described with respect to FIGS. 15 and 16, except that no channels are available from the series of first time slots 1080 during the time gaps 1082. Thus, in the FIG. 26 embodiment, it is preferable to assign time slots of the second time frame 1081 starting from the end thereof (i.e., the region corresponding to the time gap 1082 inserted between the first time frames 1080), to minimize any wasted space in the composite time frame 1085. The time gaps 1082 therefore appear as "conditional" time gaps 1086 in the composite time frame 1085, because ordinarily the conditional time gaps 1086 will include actual time gaps only when no time slots from the second time frames 1081 are assigned thereto.

Thus, while overcoming some of the problems created by having time frames of unequal length, use of time gaps nevertheless generally results in some inefficiency because a portion of the timeline is wasted, and may also lead to less flexibility because the portion of the composite time frame corresponding to the time gap may be allocated only to one of the two timing protocols.

In a similar, time gaps may be inserted between time slots of either time frame, and conditionally in the composite time frame, to make each time slot of the same duration, or a multiple of the shortest time slot duration. A similar inefficiency problem occurs with time gaps inserted between time slots.

Alternatively, a composite time frame may be constructed such that it comprises a combination of time slots from two different protocols without restriction to the time frame structure which normally defines each set of time slots. Rather, the combination of time frames is selected according to the system needs, and repeats for each composite time frame. FIG. 27 is a diagram of a composite time frame 1090 illustrating such an arrangement. The composite time frame 1090 is made up of time slots 1091 associated with a first communication protocol and time slots 1092 associated with a second communication protocol. While having greater efficiency than the FIG. 26 embodiment in that there are no time gaps leading to potential waste of the time resource, the FIG. 27 embodiment, unless the composite time frame length is equal to an integral number of the time frames of the communication protocols from which the time slots 1091, 1092 are taken, results in a timing structure that is not easily adaptable and can be difficult to integrate into different user environments.

Accordingly, the composite time frame structures shown in FIGS. 15 and 16 are preferred (i.e., where there is an integral number of each time frame 921 and 931 in each composite time frame 925 and 945) because of the relative ease of changing the ratio of time slots for the first protocol and the second protocol, according to user demand, without having to change the composite time frame length or make other internal timing adjustments. The demand migration tables of FIGS. 17A and 17B illustrate how the ratio of first protocol time slots to second protocol time slots may be modified with relative ease according to specified pairing options, without having to change the composite frame length.

Returning to FIG. 13, the first base station unit 952 communicates over time slots 926 corresponding to one of the time frames 921 or 931 (e.g., time slots 926a corresponding to the first time frame 921), and the second base station unit 953 communicates over time slots 926 corresponding to the other of the time frames 921 or 931 (e.g., time slots 926b corresponding to the second time frame 931). Thus, each base station unit 852, 853 communicates with user stations 102 according to the protocol assigned to the particular base station unit 852, 853.

In a preferred embodiment, the composite time frame structure is programmed into the integrated base station 850 so that each base station unit 852, 853 knows in advance the relative position of the time slots allocated to it. Each base station unit 852, 853 independently manages the time slots allocated to it, and independently is responsible for establishing and maintaining communication with user stations 102 using the protocol assigned to it.

In more detail, each base station unit 852, 853 is provided with means for determining which time slots of the composite time frame are available, or have been preassigned to it, for communication. The first base station unit 852 has a free slot index 863 which may comprise, for example, a static or dynamic memory. If the free slot index 863 comprises a dynamic memory, then it may be downloaded remotely by a base station controller 105 (see FIG. 2) so as to allow dynamic reprogramming of the time slot allocation to the base station units 852, 853. The free slot index 863 stores a map of time slots allocated to the base station unit 852. Thus, if composite time frame 925 of FIG. 15 is implemented in the FIG. 13 integrated base station 850, then the free slot index 863 would comprise a map having sixteen locations, each location corresponding to one of the time slots 922, with the locations corresponding to time slots TS00, TS04, TS08, and TS12 being set to indicate their assignment to the first base station unit 852.

According to the above example, when the first base station unit 852 communicates, it uses only time slots TS00, TS04, TS08 and TS12. When a channel is set up, the first base station unit 852 uses only one of the time slots from the allocated set of time slots (TS00, TS04, TS08 and TS12). In this particular embodiment, a general polling message is transmitted by the base station unit 852 to indicate the availability of a free time slot for users of the first protocol. Accordingly, a general poll message is only sent over time slots TS00, TS04, TS08 or TS12, and only when the particular time slot is free. The other time slots 922 are not used by the first base station unit 852, unless they are later assigned to it.

Likewise, the second base station unit 853 has a free slot index 873 similar to the free slot index 863 of the first base station unit 852. However, the free slot index 873 for the second base station unit 853 stores a map of time slots allocated to the second base station unit 853. Thus, if the composite time frame 925 of FIG. 15 is implemented in the FIG. 13 integrated base station 850, then the free slot index 873 would comprise a map having eight locations (or alternatively thirty-two locations, one for each position in the composite time frame), each corresponding to one of the time slots 932 for the second time frame 931, with the locations in the free slot index 973 for time slots TS2 through TS7 being set to indicate their assignment to the second base station unit 853.

According to the above example, when the second base station unit 853 communicates, it uses only one of the time slots from the allocated set of time slots (i.e., TS2 through TS7). In this particular embodiment, the second protocol is a GSM protocol, which utilizes a separate control channel for initiating communication. Thus, when the base station unit 853 receives a request to establish a new communication channel with a user station 102, it selects a free time slots only from time slots TS2 through TS7, but not TS0 or TS1, which have not been assigned to it. The second base station 853 makes this determination by examining the contents of the free slot index 873 prior to making a channel assignment.

The first base station unit 852 maintains synchronization with the second base station unit 853 by use of communication lines 869. To facilitate synchronization on a system-wide basis, the first base station unit 852 is, as previously noted, preferably configured with a GPS receiver 861, which receives timing information transmitted by satellite as may be accomplished by means well known in the art.

The GPS receiver 861 provides timing information to a clock generator 862, which generates a slot clock signal 869a and a frame clock signal 869b. FIG. 18 is a timing diagram showing a slot clock waveform 965 for the slot clock signal 869a and a frame clock waveform 966 for the frame clock signal 869b. The slot clock waveform 965 is preferably a fifty percent duty cycle square wave clock waveform (as shown in FIG. 18) that allows demarcation of the time slots TS0, TS1, TS2, ... of the first (GSM) protocol and also of the time slots TS00, TS01, TS02, ... of the second (TDD) protocol (since, in this particular embodiment, the time slots of the first protocol are of half the duration of those of the second protocol). The frame clock waveform 966 comprises a frame marker 967 at the start of each composite time frame. Using either of the composite time frames 925 or 945 of FIGS. 15 or 16, the frame marker 967 would also indicate the start of each TDD time frame 921.

By use of the slot clock signal 869a and the frame clock signal 869b, the integrated base station 850 maintains internal synchronization among the two base station units 852, 853. Each base station unit 852, 853 thereby knows the timing of each of the time slots, and knows when each composite time frame 925 or 945 starts and ends. While the GPS receiver 861 in the FIG. 13 embodiment is shown as a component of the first base station unit 852, it may also reside in the second base station unit 853, or each base station unit 852, 853 may have its own GPS receiver. Alternatively, the two base station units 852, 853 may share the same GPS receiver 861, but each have its own internal clock generation electronics, so long as the start of the composite time frame is synchronized. Alternatively, the GPS receiver 861 may be located further upstream—e.g., at a base station controller 105 (see FIG. 2)—which transmits to the integrated base station 850 timing information regarding the start of the composite time frame, and other timing information as necessary.

In a preferred embodiment, transmissions according to the second (TDD) protocol from the first base station unit 852 are wideband, and are made using spread spectrum technology. Because the first (GSM) protocol is narrowband, transmissions made according to the TDD protocol will usually cover multiple frequency channels of the GSM protocol.

FIGS. 19 and 20 are graphs illustrating frequency channelization plans for a TDD communication system and a GSM communication system, respectively, utilizing the timing structures shown in FIG. 14. In FIG. 19 is shown a frequency bandwidth 970 of predetermined width (e.g., 15 MHz in the FIG. 19 embodiment). The frequency bandwidth 970 is apportioned among individual system components and thereby provides for separation of communications by frequency division multiplexing. In the FIG. 19 embodiment, the frequency bandwidth 970 is apportioned among a plurality of system components each using approximately 1.8 MHz of bandwidth, partially overlapping so as to permit fourteen separate TDD frequency bands 972 within the frequency bandwidth 970. Each TDD frequency band 972 can support a TDD base station 104 and its constituent user stations 102. Frequencies in a geographic region are preferably reused according to the reuse pattern shown in FIG. 5 and described previously herein. Frequency guard bands 973 and 974 are preferably provided at the edges of the frequency bandwidth 970 to minimize interference with users of adjacent frequency bands.

In a preferred embodiment, transmitters operating in the TDD system of FIG. 6 transmit a wideband signal using spread spectrum technology, with a chipping rate of about 2.7 MHz (0.369 milliseconds per chip) and in accordance with techniques described in U.S. patent application Ser. No. 08/423,225 filed on Apr. 17, 1995, hereby incorporated by reference as if set forth fully herein.

FIG. 20 shows a frequency channelization plan for a GSM communication system. The FIG. 20 frequency channelization plan includes a user frequency band 976 of, e.g., 15 MHz, over which GSM user stations 102 transmit to a base station 104, and a base frequency band 977 over which a base station 104 transmits to user stations 102. Within the user frequency band 976, a plurality of frequency channels 978 are defined, each allocated a 200 KHz bandwidth (although GSM standards provide for a 271 KHz null-to-null transmission bandwidth). Thus, up to seventy-five frequency channels (not considering frequency guard bands) may be contained within the user frequency band 976. Similarly, as GSM is an FDD system, the base frequency band is divided into frequency channels 979 of 200 KHz each. The user frequency band 976 is separated by a predefined frequency separation $F_S$ from the base frequency band 977; the predefined frequency separation $F_S$ is typically 40 MHz in Europe, but may be 80 MHz or of any other suitable size in the United States and elsewhere. Preferably, each user frequency channel 978 is paired with a corresponding base frequency channel 979 separated by the predefined frequency separation $F_S$, so that each user frequency channel 978 is thus separated by the same frequency distance from its corresponding base frequency channel 979.

While seventy-five frequency channel pairings (not considering frequency guard bands) may therefore be defined within the GSM frequency channelization plan shown in FIG. 20, the GSM system is preferably deployed using a three-cell frequency reuse pattern similar to the frequency reuse pattern shown in FIG. 5 (i.e., ignoring the code reuse pattern shown in FIG. 5). Thus, only a third of the frequency channels 978, 979 are assigned to a given base station 104. Typically, a base station 104 will be assigned frequency channels 978, 979 which are evenly spaced over the frequency bands 976, 977; that is, the base station 104 will be assigned every third frequency channel 978, 979 from the lowest frequency channel pairing assigned to that base station 104, each frequency channel at the GSM base station unit 853 therefore being separated by 600 KHz from the neighboring frequency channels.

Figure 21:
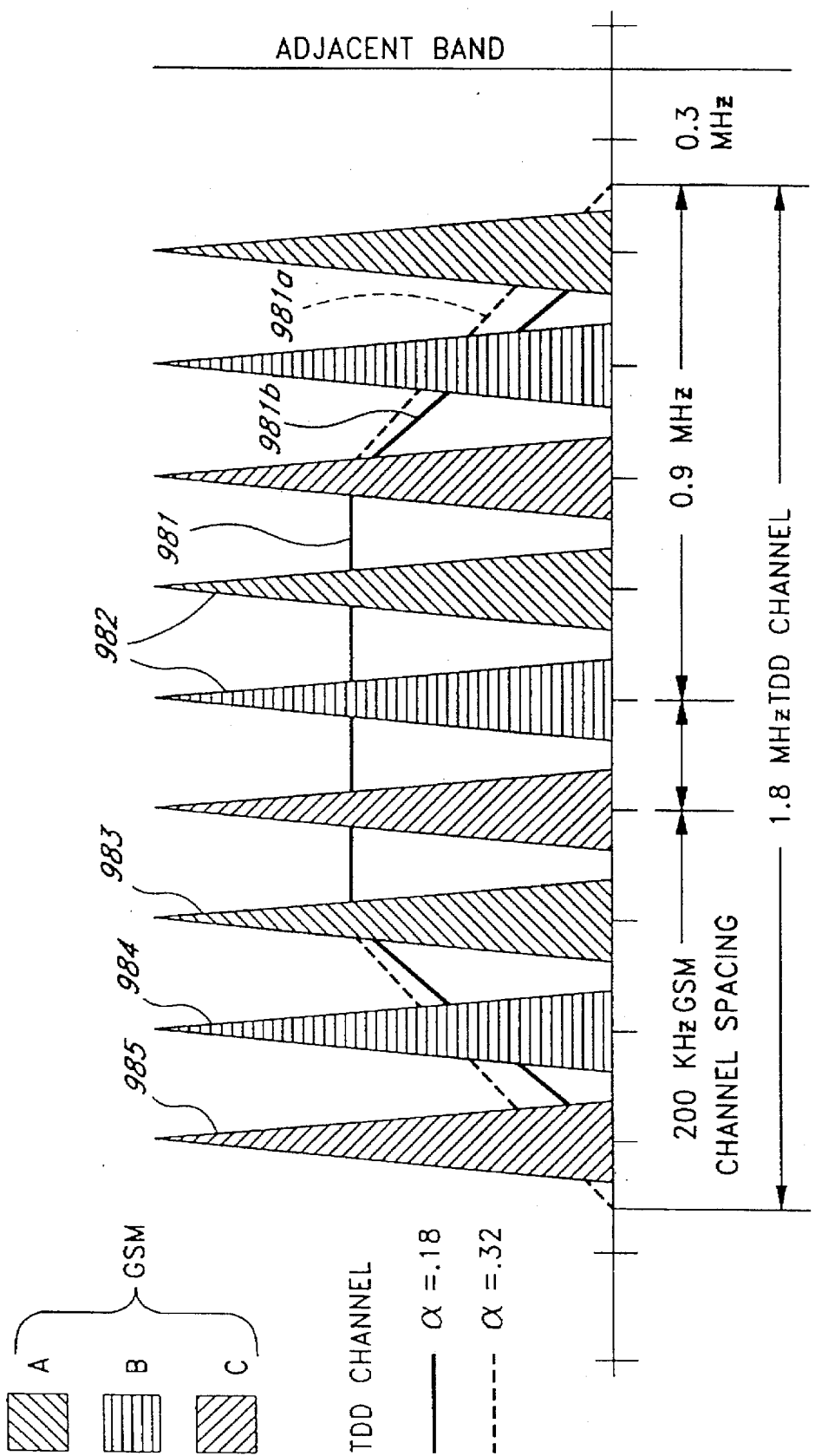

FIGS. 21 and 22 are graphs showing, for a particular embodiment, a frequency channelization relationship for the communication systems having the frequency channelization plans shown in FIGS. 19 and 20. FIG. 21 shows a relationship between the approximately 1.8 MHz bandwidth 981 assigned to a given TDD base station 104 and a plurality of frequency channels 982—in this case, nine frequency channels 982. A first set of frequency channels 983 is associated with a first set of frequencies (Group A) in the GSM three-cell frequency reuse pattern; a second set of frequency channels 984 is associated with a second set of frequencies (Group B) in the GSM three-cell frequency reuse pattern; and a third set of frequency channels 985 is associated with a third set of frequencies (Group C) in the GSM three-cell frequency reuse pattern. The Group A, Group B, and Group C frequency channels are distinguished in FIG. 21 according to the shading of each, as identified by the legend appearing in FIG. 21.

Figure 23:
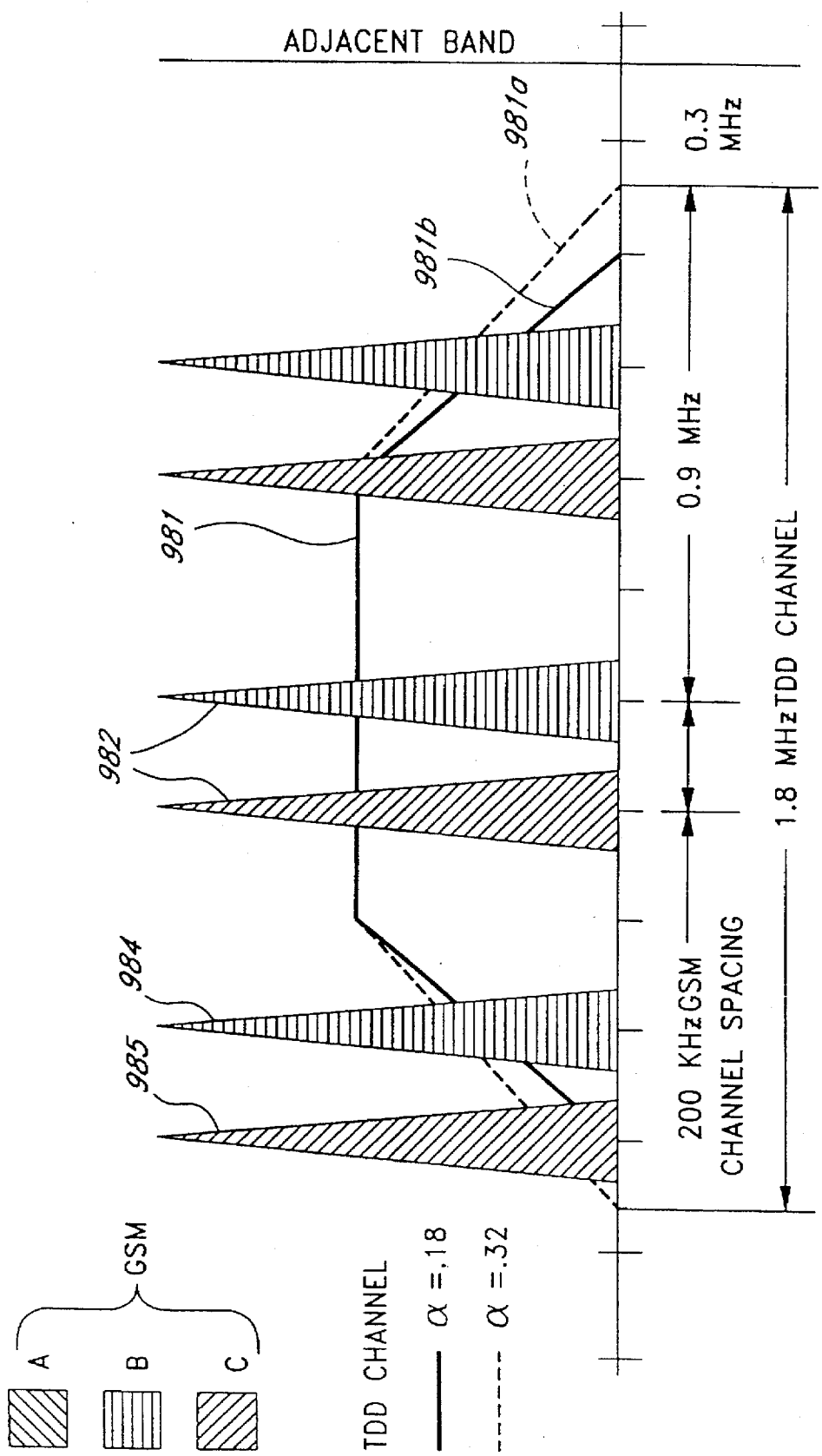
FIG. 23 is a graph showing the frequency usage of a portion of the frequency spectrum during a non-GSM time slot of a composite time frame.

In a preferred embodiment, the TDD base station unit 852 transmits in place of the GSM base station unit 853 with which it is integrated (see FIG. 13 integrated base station 850). Accordingly, the TDD base station unit 852 transmits "in place of" the GSM frequency channels with which it overlaps. For example, if the TDD base station unit 852 is integrated with a GSM base station unit 853 assigned to Group A frequencies, then, during a TDD time slot within a composite time frame (such as composite time frame 925 or 915), the frequency channel usage will appear as shown in FIG. 23. Thus, the frequency usage for an integrated base station 850 alternates, according to the time slot arrangement within a composite time frame 925 or 945, between three narrowband GSM frequency channels 982 and a single wideband TDD frequency channel 981.

Also as shown in FIG. 21, the bandwidth 981 for the TDD base station varies slightly depending on the roll-off factor or "α" associated with the TDD channel modulation spectrum. For an α of 0.32, the TDD transmitter transmits over a bandwidth 981a as shown in FIG. 21; for an α of 0.18, the TDD transmitter transmits over a slightly narrower bandwidth 981b as shown in FIG. 21. Generally, the lower the value of α, the narrower the bandwidth of the transmission and the more efficient it is; however, the more difficult it is to implement.

The frequency channelization plan of FIG. 22 illustrates the coexistence of a plurality of integrated base stations 850 in a preferred embodiment of the present invention. In FIG. 22 is shown a lower frequency band 990 and an upper frequency band 991. The lower frequency band 990 corresponds to the user frequency band 976 of FIG. 20, and the upper frequency band 991 corresponds to the base frequency band 977 of FIG. 20. A plurality of TDD frequency bands (i.e., channels) 995, 997 are defined in the lower frequency band 990 and the upper frequency band 991, respectively. Similarly, a plurality of GSM frequency channels 994, 996 are defined in the lower frequency band 990 and the upper frequency band 991, respectively. Each TDD frequency band 995 or 997 overlaps a plurality of GSM frequency channels 994 or 996 in a manner similar to that shown in and described with respect to FIGS. 21 and 23.

Because the GSM system is an FDD/TDMA system, with user stations 102 lagging behind the base station 104 in duplex communication by three time slots, the timing structure to support GSM communication with a given user station 102 is duplicated on two different frequency bands, according to the GSM frequency channel pairing for the particular user station 102. The TDD protocol of FIG. 6, however, only requires a single frequency band to support duplex communication with a given user station 102. In order to most efficiently allocate system resources, therefore, the same composite time frame structure that is deployed in one frequency band 990, 991 should also be deployed in the corresponding location in the other frequency band 990, 991. More particularly, the a composite time frame defined for operating in the upper frequency band 991 (i.e., the GSM base frequency band 977) preferably has a counterpart composite time frame defined for operating in the lower frequency band 990 (i.e., the GSM user frequency band 976), but offset and lagging by three GSM time slots.

Thus, for example, for a composite time frame 925 such as depicted in FIG. 15 supporting four TDD users and six GSM users and defined for operation in the upper frequency band 991, a counterpart composite time frame 925 supporting four additional TDD users is defined for operation in the lower frequency band 990, but lagging by three GSM time slots 932. Because the GSM system uses frequency division duplexing, the counterpart GSM time slots in the lower frequency band 990 are already used to support the same GSM users receiving base-to-user communications over the upper frequency band channels; the counterpart TDD time slots would, if not assigned to another composite time frame in the manner described, may otherwise go unused and therefore be wasted. Thus, when both the upper and lower frequency bands 991, 990 are considered, two composite time frames (one on the upper frequency band 991 and one on the lower frequency band 990) may support, for example, a total of eight TDD users and six GSM users (assuming the composite time frame 925 of FIG. 15).

In a preferred embodiment, two composite time frames are serviced by the same integrated base station 850. In this embodiment, the TDD base station unit 852 services a composite time frame in the lower frequency band 990, and another composite time frame in the upper frequency band 991. The composite time frames are preferably separated by the same frequency separation as GSM user and base transmissions (i.e., usually 40 MHz or 80 MHz). A user station 102 operating in the TDD protocol may, if interfering, by assigned a different TDD time slot (by performing a time slot interchange), or may be assigned a TDD time slot in the other frequency band 990, 991 being serviced by the same TDD base station unit 852 (by performing a frequency interchange, optionally coupled with a time slot interchange). Accordingly, the TDD base station unit 852 has a variety of options when interference becomes a problem for a given user station 102.

The integrated base station 850 of FIG. 13 is preferably capable of being configured according to any of a plurality of slot allocation options, such as any one of the five slot allocation options shown in FIG. 17A or 17B. Where only one frequency band is considered, the options of FIG. 17A are preferably employed. As shown in FIG. 17A, the more GSM users supported, the fewer TDD users are supportable, and vice versa. Each integrated base station 850 may be configured with a set of switches whereby one of the five options of FIG. 17A is manually selectable. Alternatively, each integrated base station 850 may be configured with a software table (e.g., in ROM), whereby one of the five options of FIG. 17A is selectable by software via a system control program or the base station controller 105, for example.

Where both the upper and lower frequency bands 991, 990 are considered, the options of FIG. 17B are preferably employed. In the embodiment described with respect to FIGS. 21 and 23, four TDD user channels are supportable for each three GSM user channels. Thus, for example, if all the time slots of the composite time frame pair (i.e., one upper band composite time frame and one lower band composite time frame) are allocated to GSM users, then twenty-four GSM users may be supported. If, on the other hand, all the time slots of the composite time frame pair are allocated to TDD users, then thirty-two TDD users may be supported (sixteen on each of the upper and lower frequency bands 991, 990). FIG. 17B shows several other slot allocation pairing options between these two extremes. As explained with respect to FIG. 17A, an integrated base station 850 in this embodiment is preferably provided with manual switches or a software table to enable selection from among the slot allocation pairings.

While in the TDD system each user station 102 "seizes" an available time slot by responding to a general polling message, in the GSM system a user station 102 initiates communication over a predefined control channel (known as the BCCH channel). The BCCH channel is generally selected as a specific GSM time slot on a particular base channel frequency 979 (or possibly multiple such channels). A user station 102 determines the location of the BCCH channel by scanning frequencies and time slots until the BCCH channel is recognized. The user station 102 can thereafter find out information about neighboring base stations 104, including the time/frequency channels of their respective BCCH channels, from system information transmitted over the BCCH channel to which it is currently listening.

The GSM base station unit 853 generally transmits over the BCCH channel with maximum power so that it can be heard by user stations 102 as far away as possible, and so that user stations 102 seeking to initiate communication or handoff can evaluate the relative signal power of the closest base stations 104. However, because the GSM base station unit 853 transmits with maximum power over the BCCH channel, a possibility for interference with a collocated TDD base station unit 852 exists. In particular, the BCCH channel may interfere in the high frequency band 991 with reception by the TDD base station unit 852; moreover, the interference may "spill over" into nearby frequencies due to the strength of the BCCH channel transmission. Accordingly, as the BCCH channel is predefined in frequency and time, the TDD base station unit 852 is preferably configured with electronics for interference cancellation which suppress at the TDD base station receiver the BCCH channel transmissions when they occur.

Figure 24B:
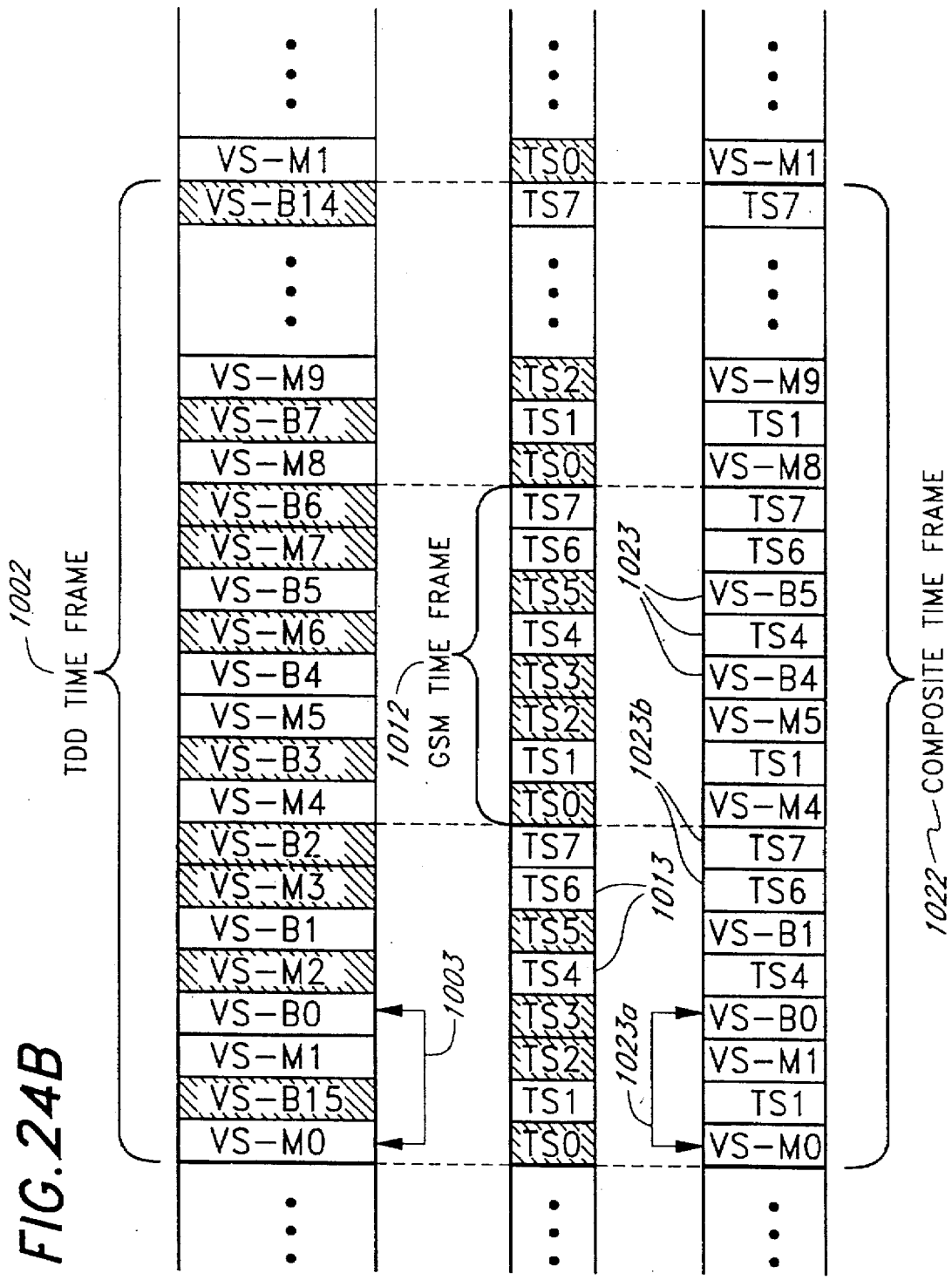
FIG. 24B is a diagram of a composite time frame shown relative to the timing structures of FIG. 24A.

FIGS. 24A and 24B are diagrams showing another embodiment of a composite time frame wherein virtual time slots (as shown in FIG. 7) are used in the TDD timing protocol. FIG. 24A is a diagram showing a timing relationship between the time frame structure of FIG. 7 utilizing virtual time slots and the GSM time frame structure. In FIG. 24A, a TDD time frame 1002 (similar to time frame 601 in FIG. 7) comprises a plurality of virtual time slots 1003. The virtual time slots 1003 are designated by "VS" followed by "M" for a user station time segment and "B" for a base station time segment, and then followed by a virtual slot numerical identifier. Thus, for example, "VS-M3" denotes a virtual time slot segment in which a user station transmits in virtual slot no. 3. A total of sixteen virtual time slots 1003 appear in the time frame 1002 of FIG. 24A. Also shown in FIG. 24A are a series of GSM time frames 1012, each having eight GSM time slots 1013. In a preferred embodiment, each segment 1004 (whether a base segment or a user segment)

of a virtual time slot 1003 has the same duration as a GSM time slot 1013.

FIG. 24B is a diagram of a composite time frame 1022 shown relative to the timing structures of FIG. 24A, and constructed according to the same principles as the composite time frames 925 and 945 shown in FIGS. 15 and 16. The main distinction is that each virtual time slot 1003 corresponds to two non-contiguous time segments 1023 of the composite time frame 1022. The composite time frame 1022 is thereby made up of a plurality of time segments 1023, which time segments 1023 are used to define GSM time slots 1023b (with one time segment 1023 per GSM time slot 1023b) and TDD virtual time slots 1023a (with two time segments 1023 per TDD virtual time slot 1023a).

In another embodiment of the invention, time slots are allocated on a dynamic basis according to user demand. FIG. 25 is a block diagram of an integrated base station 1050 having a dynamic slot allocation capability. In the FIG. 25 embodiment, the integrated base station 1050 comprises a first base station unit 1052 and a second base station unit 1053. The GPS receiver 1061, clock generator 1062, processor 1060, and free slot index 1063 function in a similar manner to their analogous counterparts in the first base station unit 852 of FIG. 13; likewise, the processor 1070 and free slot index 1073 also function in a similar manner to their analogous counterparts in the second base station unit 853 of FIG. 13.

In the FIG. 25 embodiment, each base station unit 1052, 1053 further comprises an interface 1065 and 1074, respectively, which are linked by a set of control signal lines 1069. The interface 1065 in the first base station unit 1052 is connected to the clock generator 1062, the processor 1060, and the free slot index 1063. The interface 1074 in the second base station unit 1053 is connected to the processor 1070 and the free slot index 1073. Through the interfaces 1065, 1074, and the control signal lines 1069 connecting them, the processors 1060 and 1070 may communicate with one another, may inquire as to the status of the free slot index 1063, 1073, and, in the case of the second base station unit 1073, may obtain timing and marker information from the clock generator 1062.

In this embodiment, each base station unit 1052, 1053 is initially preassigned a default time slot assignment according to a composite time frame in a similar manner to the FIG. 13 embodiment. However, the FIG. 25 integrated base station 1050 can dynamically change the time slot allocation according to user demand. In this embodiment, the free slot index 1063, 1073 of each base station unit 1052, 1053 stores information not only identifying which time slots have been assigned to the base station unit 1052 or 1053, but also which of the assigned time slots are in use (and, conversely, which time slots are therefore available). The free slot index 1063 or 1073 may be occasionally examined by the other base station unit to obtain the usage status of the other base station unit's time slots.

When a base station unit's allocated time slots become full or are approaching such a state, it may request additional time slot resources from the other base station unit 1052, 1053. This request is made over the control signal lines 1069, and may be referred to as time slot transfer request.

For example, if the second base station unit 1053 is becoming or has become full, then it sends a time slot transfer request message across the control signal lines 1069 by interface 1074. The message is received at interface 1065, which informs the processor 1060 of the request. The processor 1060 examines its free slot index 1063 to determine whether or not free time slots are available, and may further consider impending communication demands for the users it supports. If the processor 1060 determines that it can give up time slots without a significant effect on its users, it then assigns one or more of its time slots to the other base station unit 1053. It does this by first changing its free slot index 1063 to indicate that the time slots are now allocated to the other base station unit 1053, and then sends a response message over the control signal lines 1069 to the second base station unit 1053 informing it that the request for additional time slots has been granted, and also informing it of the particular time slot(s) transferred.

Upon receiving the responsive message, the second base station unit 1053 updates its free slot index 1073 to indicate the new time slots available to it. The second base station unit 1053 thereafter uses these time slots as though they were originally assigned to it. If the first base station unit 1052 later requests a time slot transfer from the second base station unit 1053, then the second base station unit 1053 will normally favor transferring the same time slots back to the first user station unit 1052. The second base station 1053 may perform a time slot interchange among its own users to effectuate such a time slot transfer back to the first base station unit 1052.

Accordingly, time slots allocated dynamically between the two base station units 1052, 1053 of the integrated base station 1050, thereby allowing usage of two different communication protocols according to user demand. Each base station unit 1052, 1053 independently manages its own time slot resources, but may transfer time slots to the other base station unit 1052, 1053 upon request. If one communication protocol is favored over the other, the system may also provide a prioritization scheme whereby a request for transfer of time slots to one of the two base station units 1052, 1053 takes precedence.

Each interface 1065, 1074 may comprise an independent microprocessor or micro-controller for facilitating transfer of control information and slot allocation requests and responses.

In addition to the embodiments thus far described, various other modifications and variations are contemplated within the scope of the present invention.

Thus, for example, although preferred embodiments have been described herein using two protocols—i.e., the GSM protocol and the TDD protocol of FIG. 6—the principles of the present invention may be expanded to encompass more than two protocols coexisting by use of the same timesharing techniques previously described. For example, each protocol may be preassigned specific time slots within a composite time frame, and each of a plurality of base station units (preferably one for each protocol) uses the time slots preassigned to its protocol. Each of the base station units in such an embodiment is preferably connected with synchronizing information including a system clock and a composite time frame marker.

Additionally, other protocols than those specifically described making use of time separation to avoid collisions among users may also be used. For example, a timesharing system having a composite time frame as previously described may operate with a first protocol such as that of FIG. 6, and a second protocol such as the Digital European Cordless Telecommunications (DECT) system protocol. The DECT protocol is an existing and well known protocol using time division multiplexing developed in and, at present, primarily deployed in Europe.

While the present invention has been set forth in the form of its preferred embodiments, many variations and modifications are possible which remain within the scope and spirit of the invention. Such variations or modifications will become clear to one of ordinary skill in the art after inspection of the specification and drawings herein. Moreover, such variations and modifications are considered to be within the purview of any appended claims.

What is claimed is:

1. A communication system comprising:
    a first protocol for time division multiple access communication, said first protocol including a first plurality of time slots;
    a second protocol for time division multiple access communication, said second protocol including a second plurality of time slots;
    an integrated base station, said integrated base station comprising a first base station unit configured to operate according to said first protocol and a second base station unit configured to operate according to said second protocol in the same geographic area:
    a synchronizing signal between said first base station unit and said second base station unit for preventing collisions between communications using said first protocol and said second protocol; and,
    means for selectively communicating according to either said first protocol or said second protocol.

2. The communication system of claim 1 wherein each time slot of said first plurality of time slots has a duration equal to an integral number of time slots of said second plurality of time slots.

3. The communication system of claim 1 wherein said first protocol is a time division duplex protocol, and wherein said second protocol is a frequency division duplex protocol.

4. The communication system of claim 1 wherein said second protocol is a GSM protocol.

5. The communication system of claim 1 wherein said first plurality of time slots and said second plurality of time slots collectively comprise a composite time frame.

6. The communication system of claim 1 wherein said integrated base station comprises a GPS receiver.

7. A communication system comprising:
    a first base station unit, said first base station unit operating according to a first protocol for time division multiple access communication in a first cellular region;
    a second base station unit, said second base unit operating according to a second protocol for time division multiple access communication in a second cellular region at least partially overlapping with said first cellular region; and
    a synchronization signal connected from said first base station unit to said second base station unit, whereby first communications between said first base station unit and user stations using said first protocol are coordinated with second communications between said second base station unit and user stations using said second protocol so as to prevent collisions between said first communications and said second communications.

8. The communication system of claim 7 wherein said first base station unit and said second base station unit are collocated.

9. The communication system of claim 7 wherein said first base station unit and said second base station unit share at least one common antenna.

10. The communication system of claim 7 further comprising a GPS receiver connected to a clock generator, said clock generator outputting said synchronization signal.

11. The communication system of claim 7 wherein said first protocol is a time division duplex protocol, and said second protocol is a frequency division duplex protocol.

12. The communication system of claim 11 wherein said second protocol is a GSM protocol.

13. The communication system of claim 11 wherein said second base station unit transmits over a first frequency band and receives over a second frequency band, and wherein said first base station unit transmits and receives over a third frequency band at least partially overlapping said first or second frequency band.

14. The communication system of claim 7 wherein said first base station unit and said second base station unit communicate over the same frequency band.

15. A method for communication comprising the steps of:
    defining a plurality of first time frames, each comprising a first group of time slots,
    defining a plurality of second time frames, each comprising a second group of time slots, wherein said first group of time slots and said second group of time slots overlap temporally; and
    selectively communicating at a given time over only one time slot from said first group of time slots and said second group of time slots.

16. The method of claim 15 wherein said step of selectively communicating at a given time over only one time slot from said first group of time slots and said second group of time slots comprises the steps of communicating in time division duplex in a first time slot from said first group of time slots, and communicating in frequency division duplex in a second time slot from said second group of time slots.

17. The method of claim 16 wherein said step of communicating in time division duplex comprises the step of transmitting a first message in a spread spectrum format, and wherein said step of communicating in frequency division duplex comprises the step of transmitting a second message in a GSM format.

18. A communication system comprising
    a first base station unit operating according to a first protocol, whereby communication between a first plurality of user stations and said first base station unit is carried out in time slots and using frequency division duplexing, said first base station unit transmitting over a first frequency band and receiving over a second frequency band;
    a second base station unit operating according to a second protocol, whereby communication between a second plurality of user stations and said second base station unit is carried out using time division duplexing, said first base station unit transmitting and receiving over at least one of said first frequency band and said second frequency band; and
    a synchronizing signal between said first base station unit and said second base station unit.

19. The communication system of claim 18 wherein said first base station unit transmits and receives messages in a GSM format.

20. The communication system of claim 18 wherein said second base station unit transmits and receives messages in a spread spectrum format.

21. The communication system of claim 18 further comprising a GPS receiver.

22. A method for communicating comprising the steps of:
    transmitting, over a first frequency band, a first base-to-user message from a first base station unit to a first user station;
    receiving said first base-to-user message at said first user station;
    transmitting, over a second frequency band at least partially overlapping said first frequency band, a first user-to-base message from a second user station to a second base station unit, said first base station unit and second base station unit being located within a same cell;

receiving said first user-to-base message at said second base station unit;

transmitting, over said second frequency band, a second base-to-user message from said second base station unit to said second user station;

receiving said second base-to-user message at said second user station;

transmitting, over a third frequency band separate and distinct from said first frequency band, a second user-to-base message from said first user station to said first base station unit; and receiving said second user-to-base message at said first base station unit.

23. The method of claim 22 wherein said first user-to-base message and said second base-to-user message are transmitted as spread spectrum messages, and said first base-to-user message and said second user-to-base message are transmitted as narrowband messages.

24. The method of claim 22 wherein said first base station unit and said second base station unit are collocated.

25. The method of claim 22 wherein said first base-to-user message and said second user-to-base message are transmitted according to a GSM protocol.

26. The method of claim 22 wherein said first frequency band is entirely contained within said second frequency band.

27. In a communication system, a timing structure for communication comprising:

a composite time frame having a duration of 18.46 milliseconds;

a plurality of first time slots in said composite time frame, each of said first time slots supporting a half-duplex GSM communication link, with a corresponding second half-duplex GSM communication link located on a different frequency band; and a plurality of second time slots in said composite time frame, each of said second time slots having twice the duration of one of said first time slots, and each of said second time slots supporting two half-duplex time division communication links.

28. The timing structure of claim 27 wherein said two half-duplex time division communication links collectively form a full duplex time division communication link.

29. The timing structure of claim 27 wherein each of said first time slots has a duration of about 576.92 microseconds, and each of said second time slots has a duration of about 1153.125 microseconds.

* * * * *